(12) United States Patent
Gupta

(10) Patent No.: US 12,133,285 B2
(45) Date of Patent: *Oct. 29, 2024

(54) TECHNIQUES TO MANAGE SERVICE REQUESTS IN A WIRELESS NETWORK

(71) Applicant: INTEL CORPORATION, Santa Clara, CA (US)

(72) Inventor: Vivek Gupta, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/836,136

(22) Filed: Jun. 9, 2022

(65) Prior Publication Data

US 2022/0303756 A1 Sep. 22, 2022

Related U.S. Application Data

(63) Continuation of application No. 16/088,261, filed as application No. PCT/US2017/015876 on Jan. 31, 2017, now Pat. No. 11,457,347.

(Continued)

(51) Int. Cl.
| | |
|---|---|
| *H04W 8/20* | (2009.01) |
| *H04W 8/08* | (2009.01) |
| *H04W 60/04* | (2009.01) |
| *H04W 68/00* | (2009.01) |
| *H04W 76/25* | (2018.01) |
| *H04W 80/10* | (2009.01) |

(52) U.S. Cl.
CPC ............... *H04W 8/20* (2013.01); *H04W 8/08* (2013.01); *H04W 60/04* (2013.01); *H04W 68/005* (2013.01); *H04W 76/25* (2018.02); *H04W 80/10* (2013.01)

(58) Field of Classification Search
CPC ......... H04W 8/20; H04W 76/25; H04W 8/08; H04W 60/04; H04W 68/005; H04W 80/10
USPC ................ 370/329, 328, 338, 341, 345, 350
See application file for complete search history.

(56) References Cited

U.S. PATENT DOCUMENTS

| | | | |
|---|---|---|---|
| 11,457,347 B2* | 9/2022 | Gupta | ................... H04W 76/12 |
| 2013/0107863 A1* | 5/2013 | Faccin | ................. H04W 36/14 |
| | | | 370/331 |

(Continued)

*Primary Examiner* — Nghi H Ly
(74) *Attorney, Agent, or Firm* — KDW Firm PLLC

(57) ABSTRACT

Embodiments are directed to techniques to manage service requests in a wireless network. In one embodiment, an apparatus may comprise processing circuitry. The apparatus may further include computer-readable storage media having stored thereon instructions for execution by the processing circuitry. The instructions, when executed, may determine, at user equipment (UE) operating in an Evolved Packet System (EPS) mobility management (EMM)-IDLE mode and configured to use EPS services with control plane Cellular Internet of Things (CIoT) EPS optimization, to initiate a service request procedure to enable transfer of user data via a control plane, generate a service request message that contains a service type information element (IE) comprising a service type value set to indicate either a mobile originating request or a mobile terminating request, and send the service request message to a mobility management entity (MME) to initiate the service request procedure. Other embodiments are described and claimed.

23 Claims, 12 Drawing Sheets

Related U.S. Application Data

(60) Provisional application No. 62/329,328, filed on Apr. 29, 2016.

(56) References Cited

U.S. PATENT DOCUMENTS

| | | | |
|---|---|---|---|
| 2017/0279924 A1* | 9/2017 | Luliano | H04L 67/146 |
| 2019/0037441 A1* | 1/2019 | Liu | H04W 28/06 |

* cited by examiner

FIG. 8
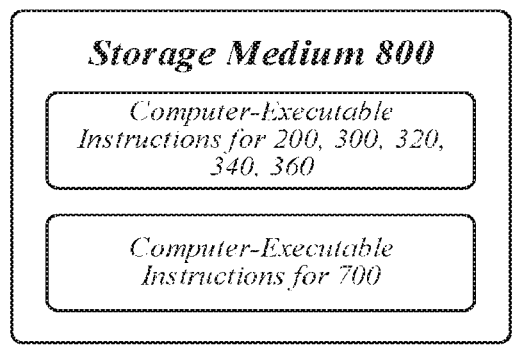
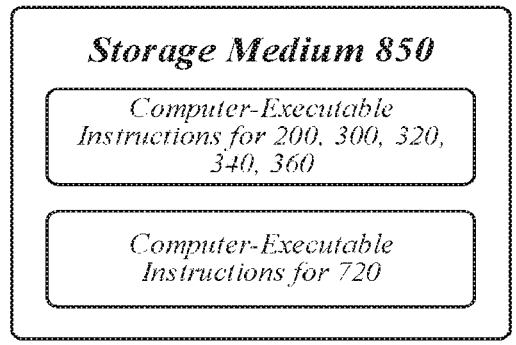

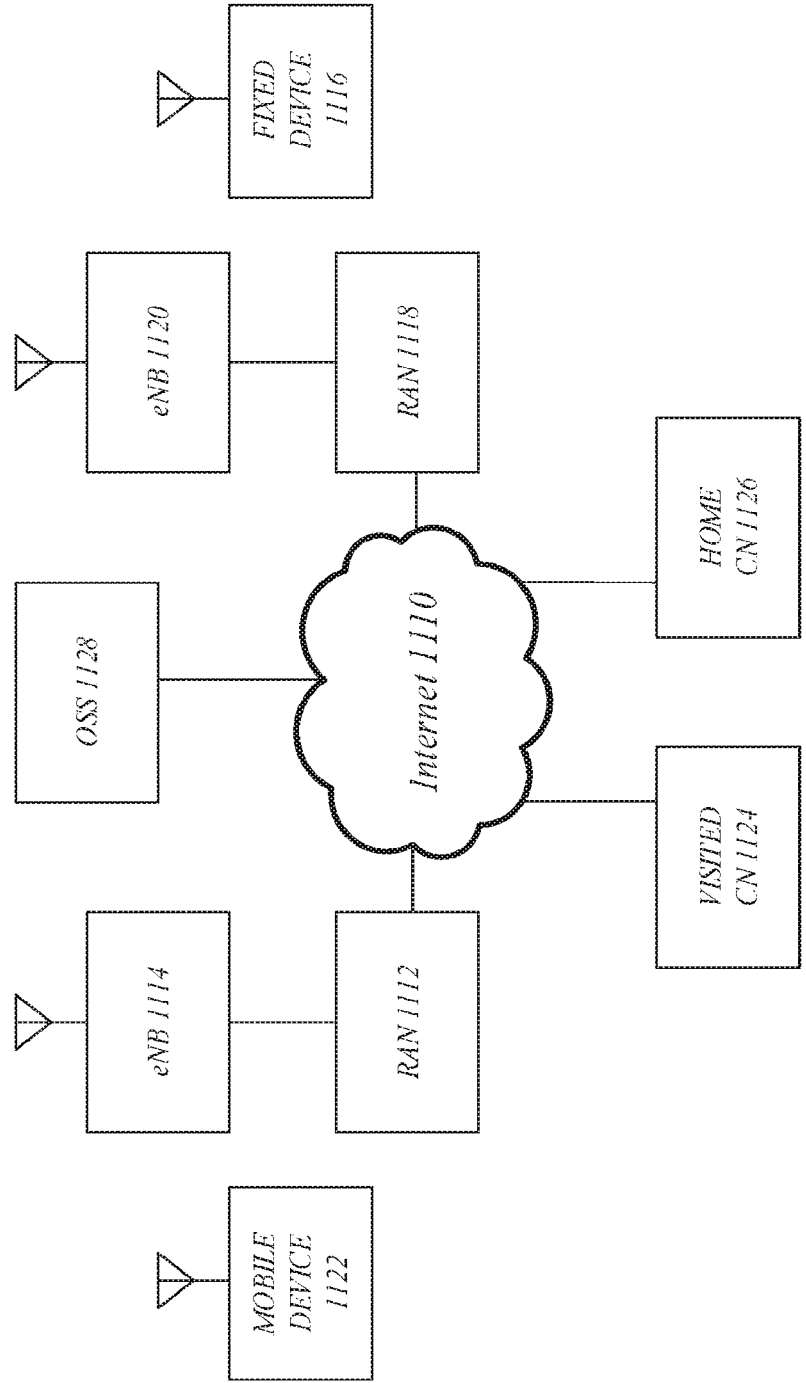

TECHNIQUES TO MANAGE SERVICE REQUESTS IN A WIRELESS NETWORK

CROSS-REFERENCE TO RELATED APPLICATIONS

This application is a continuation of, claims the benefit of and priority to previously filed U.S. patent application Ser. No. 16/088,261, filed Sep. 25, 2018, entitled "TECHNIQUES TO MANAGE SERVICE REQUESTS IN A WIRELESS NETWORK", which is a national phase application claiming the benefit of and priority to International Patent Application No. PCT/US2017/015876, filed Jan. 31, 2017, which claims priority U.S. Provisional Patent Application No. 62/329,328, filed Apr. 29, 2016, all of which are hereby incorporated by reference in their entireties.

TECHNICAL FIELD

Embodiments herein generally relate to communications between devices in wireless communications networks.

BACKGROUND

With a wide range of potential applications, machine type communication (MTC) or machine to machine (M2M) communication is gaining a tremendous interest among mobile network operators, equipment vendors, MTC specialist companies, and research bodies. The idea of M2M communications is to enable M2M components to be interconnected, networked, and controlled remotely with low-cost scalable and reliable technologies. M2M communication could be carried over mobile networks. In M2M communication, the role of mobile network is largely confined to serve as a transport network. M2M devices or user equipment (UEs) coupled to a mobile network may be capable of replying to requests for data contained within these types of UEs. These UEs may also be capable of transmitting data autonomously and parameters defining what or when data is transmitted may be adjusted or updated responsive to trigger messages.

BRIEF DESCRIPTION OF THE DRAWINGS

FIG. 8 illustrates embodiments of storage media.
FIG. 11 illustrates an embodiment of a wireless network.

DETAILED DESCRIPTION

Figure 1:
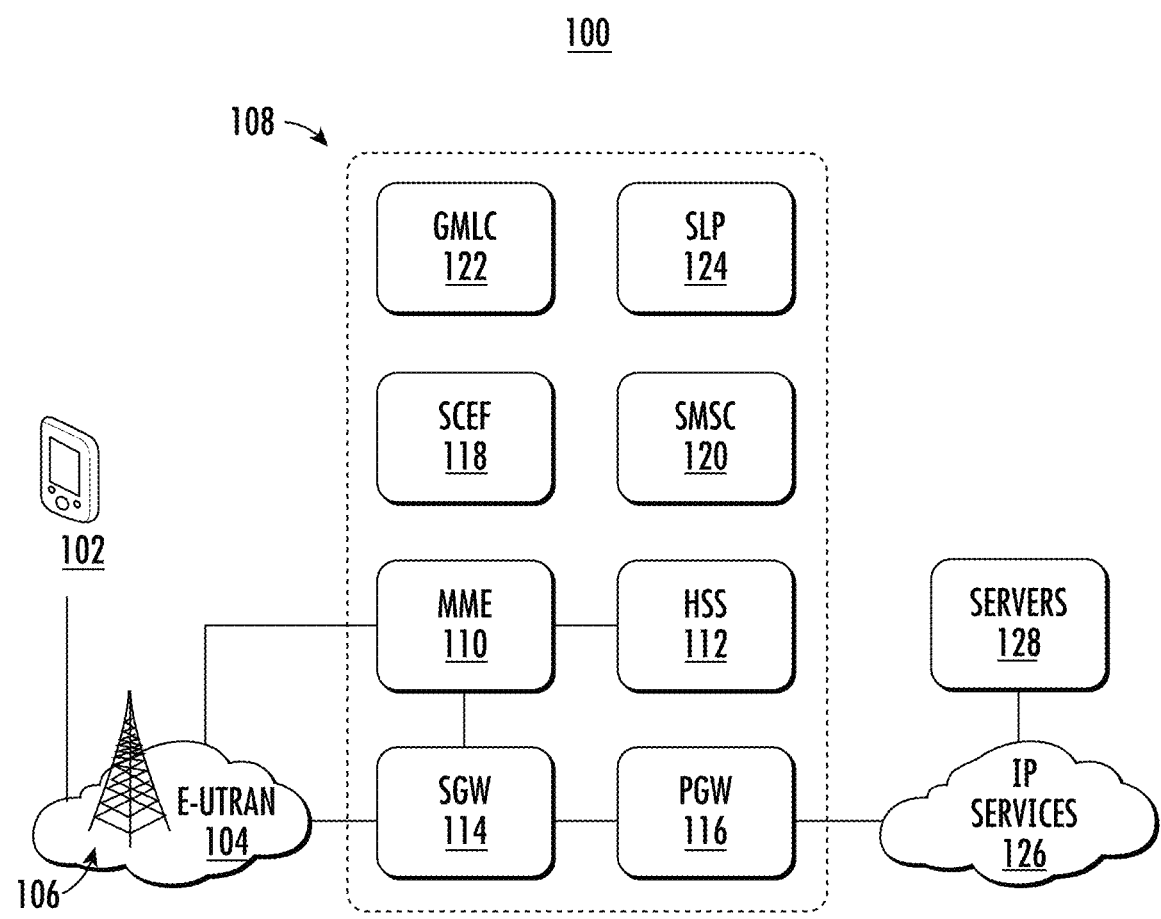
FIG. 1 illustrates an embodiment of a communication system.

Various embodiments are generally directed to techniques for improving wireless communications between devices in wireless networks, such as a wireless network defined by one or more 3rd Generation Partnership Project (3GPP) technologies and/or standards, for example. In some embodiments, a wireless network may operate in accordance with one or more 3GPP Long Term Evolution (LTE), and/or 3GPP LTE-Advanced (LTE-A) technologies and/or standards. In one embodiment, for example, a wireless network may operate in accordance with the 3GPP Technical Specification (TS) 24.301 titled "Technical Specification Group Core Network and Terminals; Non-Access-Stratum (NAS) protocol for Evolved Packet System (EPS); Stage 3 (Release 14)," V14.1.0, September 2016 ("3GPP Stage 3 Specification"), including any revisions, progeny, and/or variants. Embodiments are not limited to these examples.

The 3GPP Stage 3 Specification defines protocols for mobility management and session management between User Equipment (UE) and a Mobility Management Entity (MME) in an Evolved Packet System (EPS). These protocols typically belong to a non-access stratum (NAS). An EPS Mobility Management (EMM) protocol provides procedures for the control of mobility when a UE is using an Evolved Universal Terrestrial Radio Access Network (E-UTRAN). The EMM protocol also provides control of security for the NAS protocols. An EPS Session Management (ESM) protocol provides procedures for handling of EPS bearer contexts. Together with the bearer control provided by the access stratum, the ESM protocol is used for control of user plane bearers.

Various embodiments implement techniques to create and/or improve EMM connection management procedures as defined by, for example, section 5.6 (among others) of the 3GPP Stage 3 Specification. For instance, one embodiment implements techniques to create and/or improve one or more service request procedures as defined by section 5.6.1 (among others) of the 3GPP Stage 3 Specification. For instance, one embodiment implements techniques to create and/or improve one or more service request procedures as defined by section 8.2 (among others) of the 3GPP Stage 3 Specification.

A UE may send a service request message to a MME in accordance with one or more service request procedures. A service request procedure manages transfer of a UE from an EMM-IDLE mode to an EMM-CONNECTED mode. A UE is in EMM-CONNECTED mode when a NAS signaling connection between a UE and network is established. The term EMM-CONNECTED mode, for example, may correspond to the term ECM-CONNECTED state used in the 3GPP Stage 2 Specification in TS 23.401. A UE is in an EMM-IDLE mode when no NAS signaling connection between a UE and network exists, or when a RRC connection suspend has been indicated by lower layers. The term EMM-IDLE mode, for example, may correspond to the term ECM-IDLE state used in the 3GPP Stage 2 Specification. If a UE is not using EPS services with control plane Cellular Internet of Things (CIoT) EPS optimization, the service request procedure is used to establish the radio and S1 bearers when user data or signaling is to be sent. The user data in this case is sent over the user plane only. If a UE is using EPS services with control plane CIoT EPS optimization, this procedure can be used for UE initiated transfer of user data via the control plane. A UE typically initiates or invokes service request procedures. However, a network element may also initiate or invoke service request procedures as well. This can be accomplished, for example, through a paging procedure.

A MME may send a SERVICE ACCEPT message to a UE in accordance with one or more service request procedures. A service request procedure manages acceptance of a SERVICE ACCEPT message. For instance, a MME may send a SERVICE ACCEPT message to complete the service request procedure initiated by a UE. Embodiments are not limited to this example.

Various embodiments may implement techniques to improve service request procedures in a wireless network arranged in accordance with the 3GPP Stage 3 Specification. In one embodiment, for example, an apparatus may comprise processing circuitry and computer-readable storage media having stored thereon instructions for execution by the processing circuitry. The instructions, when executed by a UE operating in an Evolved Packet System (EPS) mobility management (EMM)-IDLE mode and configured to use EPS services with control plane CIoT EPS optimization, may determine to initiate a service request procedure to enable a transfer of user data via a control plane. The UE may generate a service request message, such as a data service request message (e.g., DATA SERVICE REQUEST), that contains a service type information element (IE) comprising a service type value set to indicate either a mobile originating request or a mobile terminating request. The UE may send the service request message (e.g., DATA SERVICE REQUEST) to a MME to initiate the service request procedure. Other embodiments are described and claimed.

Embodiments as described herein provide significant technical advantages. For instance, embodiments may support IoT and CIoT applications, where mobile network operators need to address usage scenarios with devices that are power efficient over lengthy periods of time, such as several years or decades. This can be particularly difficult in challenging coverage conditions, such as when M2M or MTC devices are located inside commercial buildings or residential homes. Furthermore, devices need to be at a price point where they can be deployed on a massive scale and potentially disposable. As such, embodiments support highly efficient handling of frequent and infrequent smaller data transmission with reduced overhead for system signaling in wireless networks. Furthermore, embodiments accomplish this while maintaining security, supporting power consumption optimizations, simplifying mobility and session management procedures, supporting paging operations, and other network operations.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates a communication system 100. In one embodiment, for example, the communication system 100 may be implemented as a 3GPP system. Various devices and/or network entities of the communication system 100 may implement techniques to improve service request procedures in accordance with the 3GPP Stage 3 Specification, as modified using one or more of the principles described herein.

As shown in FIG. 1, the communication system 100 illustrates a variety of components that may be used to provide communication services or access to one or more 3GPP devices. The communication system 100 includes a UE 102 and an E-UTRAN 104. The E-UTRAN 104 may include one or more evolved node B (eNB) 106. The communication system 100 may include more or less devices as well.

In one embodiment, for example, the UE 102 and eNB 106 may be implemented as narrowband devices configured to wirelessly communicate with each other in accordance with a NB-LTE bandwidth. The NB-LTE bandwidth may generally comprise a bandwidth that is smaller than a minimum bandwidth that may be permitted in a conventional LTE system. In some embodiments, the NB-LTE bandwidth may comprise a bandwidth corresponding to one LTE physical resource block (PRB). In various embodiments, the NB-LTE bandwidth may comprise a 180 kHz bandwidth. In some embodiments, the NB-LTE bandwidth may comprise a 200 kHz bandwidth. It may be appreciated that although operating environment 100 as shown in FIG. 1 is described as a NB-LTE network, embodiments may also be implemented in other types of wireless networks, such as various mobile broadband wireless communications networks. The embodiments are not limited in this context.

The communication system 100 also includes a core network 108 communicatively coupled to the UE 102, E-UTRAN 104 and/or eNB 106. The core network 108 may comprise, for example, an evolved packet core (EPC) that includes an MME 110, a home subscriber server (HSS) 112, a serving gateway (SGW) 114, a packet data network (PDN) gateway (PGW) 116, a service capability exposure function (SCEF) 118, a short message service (SMS) center (SMSC) 120, a gateway mobile location center (GMLC) 122, and a secure user plane location (SUPL) secure location platform (SLP) 124, among other core network entities.

In general, the SGW 114 and PGW 116 may provide access to an operator's internet protocol (IP) services 126, which may provide access to one or more third party servers 128, such as web servers or application servers. The SCEF 118 may provide one or more power saving mode parameters or enhanced power saving mode parameters to one or more other internal or external entities to allow for timed communication to the UE 102 or to allow knowledge of a current availability of the UE 102. The SMSC 120 may be configured to store, forward, convert and/or deliver SMS messages. The SMSC 120 may include one or more of an SMS service center (SMS-SC), SMS gateway service center (SMS-GMSC), or other SMS infrastructure or system to interface with SMS infrastructure. The GMLC 122 may comprise a control-plane system that may be used to determine or provide a location of a UE or other mobile station. The SLP 124 may be a user-plane system that may be used to determine or provide a location of a UE or other mobile station.

In various embodiments, the communication system 100 may implement devices having enhancements and optimizations for features and capabilities relating to CIoT for connecting to an EPS network, such as defined by the 3GPP Stage 3 Specification and techniques provided herein, for example. Similarly, the EPS network may also be enhanced for CIoT features, such as defined by the 3GPP Stage 3 Specification and techniques provided herein, for example. Embodiments are not limited in this context.

Certain CIoT features were defined in 3GPP TS 21.101 V13.0.0 (2016-12) titled "Technical Specification Group Services and System Aspects; Technical Specifications and Technical Reports for a UTRAN-based 3GPP system (Release 13)," dated December 2016 ("3GPP Release 13"). 3GPP Release 13 specified a number of CIoT optimizations, including a control plane EPS optimization (also referred to as "Data via MME") and a user plane EPS optimization (also referred to as "User Plane Solution").

Figure 5:
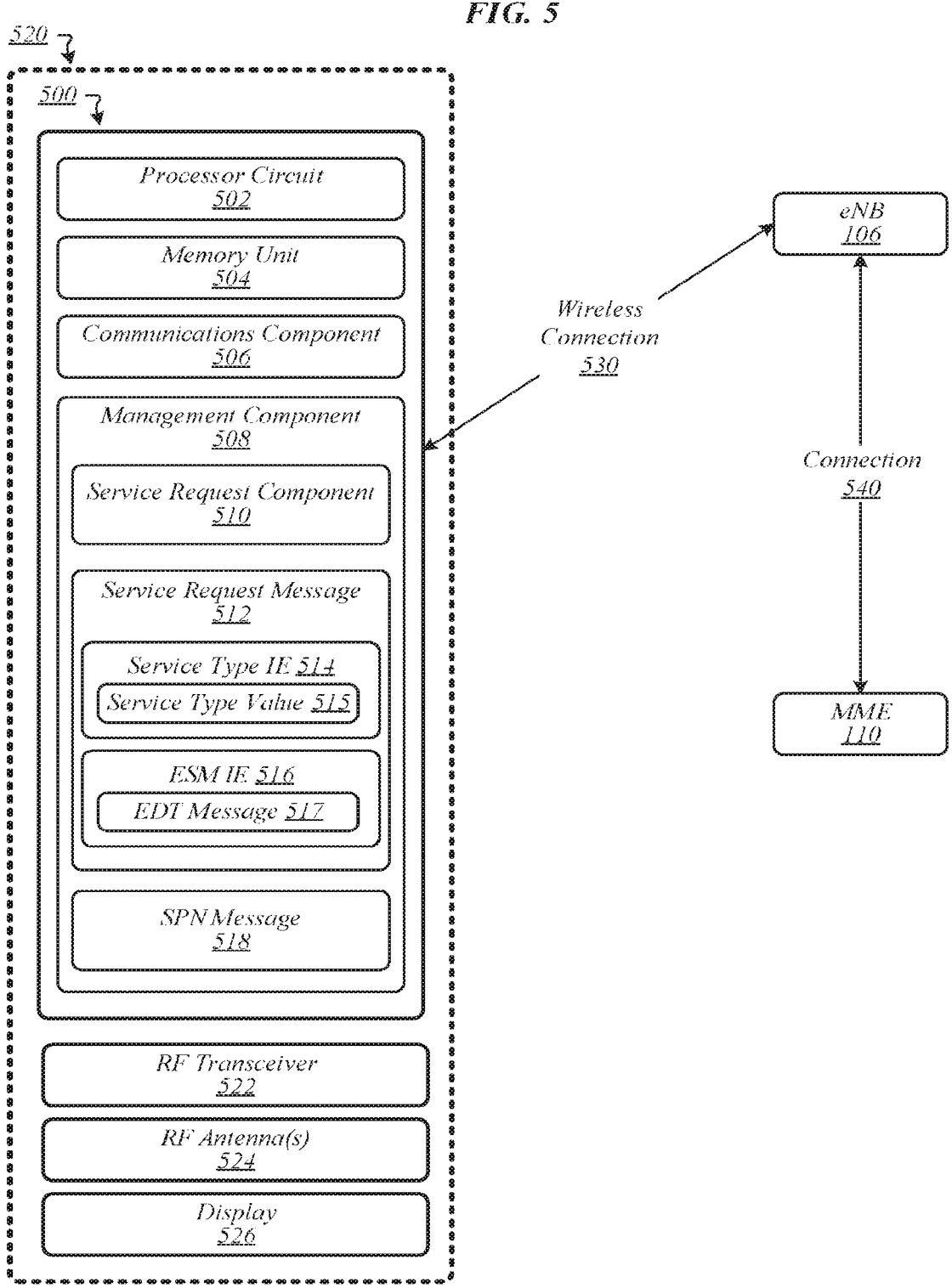
FIG. 5 illustrates an embodiment of a first apparatus and system.

One feature of the control plane EPS optimization results in new NAS messages to carry data (via MME), ciphering and integrity protection, Internet Protocol (IP) header compression at MME, and so forth. During idle to connected mode transitions, however, the optimizations do not establish user plane connection. For the MT case, as shown in FIG. 5.3.4B.3-1 in the 3GPP Stage 3 Specification, the paging message (as shown in steps 3 and 4) does not indicate whether the paging is due to downlink data from the user plane (e.g., a S1-U connection) or due to the control plane (e.g., a SCEF connection). Therefore, based on just the paging message, the UE is not aware whether user plane bearers are required to be established for MT data from control plane connections. In various embodiments, the paging message may be modified to contain this distinction, and may specific if user data is intended to be delivered via a user plan or a control plane, as described in more detail below.

One feature of the user plane EPS optimization results in storing eNB context in eNB and UE in an idle state. The UE may utilize new suspend and resume procedures. For instance, during a Suspend Connection procedure, the UE stores AS information as it transitions into an EMM-IDLE mode. The eNodeB stores AS information, a S1AP association and a bearer context for the UE. The MME stores the S1AP association and the bearer context for the UE and enters EMM-IDLE. During a Resume Connection procedure, the UE resumes the connection with the network using the AS information stored during the Suspend Connection procedure, the eNodeB notifies the MME that the connection with the UE is resumed, and MME enters an EMM-CONNECTED mode.

Various embodiments propose modifications and updates to certain procedures defined in the 3GPP Stage 3 Specification and/or 3GPP Release 13. More particularly, some embodiments implement a way for handling mobile terminated data transfer operations for narrowband (NB)-IoT or CIoT devices for both control plane and user plane optimizations. Embodiments also implement updates to a paging procedure for NB-IoT or CIoT devices for both control plane and user plane optimizations.

In one embodiment, for example, the MME 110 may send a paging message that includes a source of downlink data. Alternatively, the MME 110 may leave a paging message unmodified. In either case, the UE 102 responds with a new DATA SERVICE REQUEST message as part of an updated service request procedure. If the UE 102 knows the source of downlink data, the UE 102 requests the MME 110 to establish appropriate bearers as part of the DATA SERVICE REQUEST message. If the UE 102 does not know the source of downlink data, the MME 110 sets up the appropriate bearers as it knows the source of downlink data. The UE 102 may use a timer to determine whether the MME 110 has setup things appropriately. Alternatively, the MME 110 may explicitly send a new SERVICE ACCEPT message to the UE 102 with appropriate information.

To accomplish this, embodiments may implement a novel DATA SERVICE REQUEST message and a novel SERVICE ACCEPT message, and accompanying procedures. The new DATA SERVICE REQUEST message includes a device properties IE for low priority IoT devices, and includes an ESM message container to piggyback an ESM message. This is at least 6 octets more efficient than an EXTENDED SERVICE REQUEST message as it does not include a MME temporary mobile subscriber entity (TMSI) (M-TMSI).

For mobile terminated data transfer and paging operations, when the user data is sent in EMM-CONNECTED mode, the UE 102 and the MME 110 use an ESM message such as ESM DATA TRANSPORT to transfer data. When user data is to be sent in an uplink (UL) channel when the UE 102 is in an EMM-IDLE mode, the UE 102 uses a service request procedure and a new EMM message DATA SERVICE REQUEST as an initial NAS message. The DATA SERVICE REQUEST message includes a ciphered ESM message ESM DATA TRANSPORT in a new ESM message container IE. The DATA SERVICE REQUEST message may also be used without an ESM message container or with an empty ESM message container to respond to paging from the MME 110. The MME 110 in turn responds with a SERVICE ACCEPT message to terminate the service request procedure.

By way of example, assume the UE 102 has enhancements and optimizations for features and capabilities relating to Cellular Internet of Things (CIoT) for connecting to an Evolved Packet System (EPS) network that is also enhanced for CIoT features. The UE 102 may be configured to use EPS services with control plane CIoT EPS optimization. The EPS network may include network entities such as those identified in the core network 108.

When operational within the communication system 100, assume the UE 102 needs to transfer mobile originating (MO) data via a control plane to the MME 110 and/or a network entity in the core network 108 (e.g., configured as an EPS network) may need to transfer mobile terminating (MT) data via a control plane to the UE 102. The UE 102 may determine to initiate a service request procedure to enable transfer of user data via a control plane. The UE 102 may generate a service request message (e.g., DATA SERVICE REQUEST) that contains a service type information element (IE) comprising a service type value set to indicate either a MO request or a MT request. The UE 102 may send the service request message to the MME 110 to initiate the service request procedure.

Assume the UE 102 is currently placed in an EMM-IDLE mode. An EMM entity in the UE 102 may initiate a data transfer procedure via the control plane by sending a DATA SERVICE REQUEST message. The DATA SERVICE REQUEST message may include an ESM message container IE which contains data to be sent in an ESM DATA TRANSPORT message. A data service type of the DATA SERVICE REQUEST message indicates a MO request. The DATA SERVICE REQUEST message is ciphered and integrity protected, and sent to the MME 110. The UE 102 may optionally include a supervision timer to monitor success of the DATA SERVICE REQUEST message and the completion of the service request procedure. Alternatively, the UE 102 may wait for an explicit message from the MME 110 (such as a SERVICE ACCEPT message or a SERVICE REJECT message) in response to the DATA SERVICE REQUEST message to complete the service request procedure.

When the MME 110 receives the ESM DATA TRANSPORT message, the MME 110 identifies a bearer (e.g., a SCEF connection) on which to transfer the user data inside the core network 108 based on the EPS bearer identity included in the ESM DATA TRANSPORT message. The MME 110 then forwards contents (e.g., user data) of the ESM message container IE accordingly. On a successful transfer of container contents, the MME 110 sends a SERVICE ACCEPT message to the UE 102. The UE 102 in turn does not release the EPS bearer context. On an unsuccessful transfer of container contents, the MME 110 sends a SERVICE REJECT message to the UE 102.

Just as the UE 102 may need to transfer MO data via a control plane to the MME 110, one or more entities of the core network 108 may need to transfer mobile terminating (MT) data to the UE 102. In this case, the MME 110 may send a paging request to the UE 102 for MT data. Further, the network may indicate whether to "transfer user data via control plane" or "transfer user data via user plane" based on preferences and/or capabilities of the UE 102.

In some cases, a paging request may include a source of downlink data, such as a PGW 116 or SCEF 118, for example. When the UE 102 receives a paging message indicating a "transfer user data via the control plane," the UE 102 may respond with a DATA SERVICE REQUEST message. A data service type of the DATA SERVICE REQUEST message may indicate a MT request. The UE 102 may also indicate to the MME 110 to setup appropriate CP/UP bearers based on the source of the downlink data (e.g., a connection). For instance, the paging message may include various parameters, such as a first parameter to indicate a source of downlink data, and a second parameter to indicate whether the control plane or a data plane will transfer the user data.

In some cases, a paging request may omit the source of downlink data. When the UE 102 receives a paging message indicating a "transfer user data via the control plane," the UE 102 may respond with a DATA SERVICE REQUEST message. A data service type of the DATA SERVICE REQUEST message may indicate a MT request. When the MME 110 receives the DATA SERVICE REQUEST message with a data service type of MT request, the MME 110 may send an ESM DATA TRANSPORT message. When the UE 102 receives the ESM DATA TRANSPORT message, the UE 102 may forward the container data to an upper layer of the network protocol stack using an EPS bearer identity.

Although the communication system 100 is described as a 3GPP system, it may be appreciated that the communication system 100 may be implemented in accordance with other wireless standards and/or specifications as well. The techniques disclosed herein may involve transmission of data over one or more wireless connections using one or more wireless mobile broadband technologies. Various embodiments may additionally or alternatively involve transmissions according to one or more Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies and/or standards may also include, without limitation, any of the Institute of Electrical and Electronics Engineers (IEEE) 802.16 wireless broadband standards such as IEEE 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants.

Some embodiments may additionally or alternatively involve wireless communications according to other wireless communications technologies and/or standards. Examples of other wireless communications technologies and/or standards that may be used in various embodiments may include, without limitation, other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, 3GPP TS 23.682, and/or 3GPP TS 24.301, and/or near-field communication (NFC) standards such as standards developed by the NFC Forum, MulteFire and MulteFire Alliance standards and/or specifications such as MulteFire Specification 1.0, including any revisions, progeny, and/or variants of any of the above. The embodiments are not limited to these examples In addition to transmission over one or more wireless connections, the techniques disclosed herein may involve transmission of content over one or more wired connections through one or more wired communications media. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Figure 2:
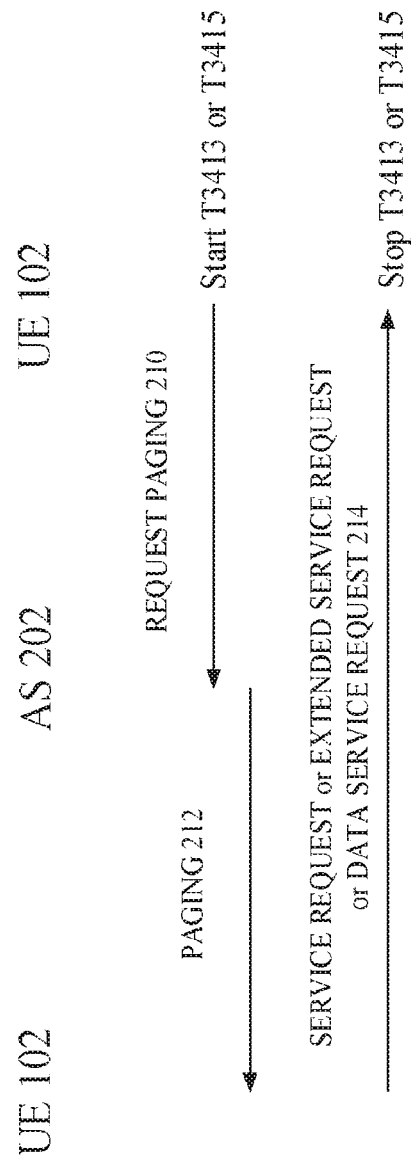
FIG. 2 illustrates an embodiment of a first message flow.

FIG. 2 illustrates an exemplary message flow 200 for the communication system 100. More particularly, the message flow 200 illustrates handling paging for MT data transfer in the communication system 100. The message flow 200 shows modifications to a paging procedure for a UE 102 enabled with CIoT optimizations In the communication system 100, upon reception of a paging indication, if the UE 102 is in an EMM-IDLE mode without suspend indication and control plane CIoT EPS optimization is used by the UE 102, the UE 102 may stop a timer T3346, if running, and initiate a service request procedure. If the UE 102 has uplink user data to send to the core network 108 over the control plane via the MME 110 when receiving the paging indication, the UE 102 may send a DATA SERVICE REQUEST message. This message may include an ESM message container IE which contains user data to be sent in a ESM DATA TRANSPORT message.

In some embodiments, the MME 110 may include an indication in the paging message as to a type of connection (e.g., data transfer) that has caused the paging. For example, the paging can be due to downlink data from the user plane (S1-U connection) or due to control plane (SCEF connection). The UE 102 can then respond appropriately with a DATA SERVICE REQUEST message and can ask the MME 110 to setup any relevant bearers.

In another embodiment, the MME 110 may not provide any indication as to a type of data that has caused paging. In this case, the UE 102 may just respond with a DATA SERVICE REQUEST message, and it would be up to the MME 110 to setup any relevant bearers as part of the response. The MME 110 may indicate setup information accordingly as part of a SERVICE ACCEPT message.

An example of a paging procedure is specified in section 5.6.2 of the 3GPP Stage 3 Specification. The paging procedure is used by the network to request establishment or resumption of a NAS signaling connection to the UE 102. According to section 5.6.2.2.1 of the 3GPP Stage 3 Specification, upon reception of a paging indication, the UE 102 can initiate one of two procedures: (1) a service request procedure; or (2) a tracking area update procedure when timer T3346 is running. Since a paging message does not explicitly indicate whether the paging was initiated due to downlink data from the control plane or the user plane, and generally timer T3346 will not be running, the UE 102 frequently uses a service request procedure. As such, on receipt of a paging message, the UE 102 may respond with a new DATA SERVICE REQUEST message with a service type that indicates a MT request.

As shown in the message flow 200, for example, the MME 110 may send a request for paging 210 to an access stratum (AS) 202. The MME 110 may also start timer T3413 or T3415. The AS 202 is a functional layer in the UMTS and LTE wireless telecommunications protocol stacks between a radio network and user equipment. It may comprise, for example, various AS protocols. In general, the AS 202 is responsible for transporting data over a wireless connection and managing radio resources. The AS 202 may receive request paging 210, and send a paging indication 212 to the UE 102. The UE 102 may send a SERVICE REQUEST, an EXTENDED SERVICE REQUEST or a DATA SERVICE REQUEST message 214 to the MME 110. The MME 110 may receive the SERVICE REQUEST, the EXTENDED SERVICE REQUEST or the DATA SERVICE REQUEST message, and stop timer T3413 or T3415. Note that, by 3GPP convention, certain embodiments express message names in upper case letters, and procedure names in lower case letters. However, embodiments are not limited to this convention.

FIGS. 3A-D illustrate exemplary message flows 300, 320, 340 and 360, respectively, for the communication system 100. The message flows 300, 320, 340 and 360 show various modifications to a service request procedure to handle MT data transfer for a CIoT device.

Since a network will not respond with setting up user plane bearers, the MME 110 responds with a new SERVICE ACCEPT message followed by an ESM DATA TRANSPORT message. The SERVICE ACCEPT and ESM DATA TRANSPORT messages are ciphered and integrity protected. Alternatively, the ESM DATA TRANSPORT message could be included in an ESM message container IE included in the SERVICE ACCEPT message, and then only the SERVICE ACCEPT message would be integrity protected. When receiving the ESM DATA TRANSPORT message, the UE 102 may forward container contents to upper layers of the network protocol stack using an EPS bearer identity included in the ESM DATA TRANSPORT message.

As shown in the message flow 300, the UE 102 may initiate a service request procedure by sending a DATA SERVICE REQUEST message 302 to the MME 110 via the AS 202. The UE 102 may also start a timer T3417. The MME 110 may receive the DATA SERVICE REQUEST message 302, and respond with a security protected NAS message 304. Examples of a security protected NAS message 304 may include without limitation a SECURITY MODE COMMAND, a SERVICE ACCEPT message, or an ESM DATA TRANSPORT message. The UE 102 may receive the security protected NAS message 304, and stop the timer T3417.

As shown in the message flow 320, the UE 102 may initiate a service request procedure by sending a DATA SERVICE REQUEST message 322 to the MME 110 via the AS 202. The UE 102 may also start a timer T3417. The MME 110 and/or the AS 202 may receive the DATA SERVICE REQUEST message 322. The AS 202 may respond with an AS indication message 324 with information about release of a radio resource control (RRC) connection. An AS indication message 324 may provide indications from lower layers and/or results of procedures triggered by the MME 110 in the service request procedure. Triggered procedures could comprise, for example, a RRC connection release procedure or RRC connection reconfiguration procedure, such as defined in 3GPP TS 36.331. The UE 102 may receive the AS indication message 324, and stop the timer T3417.

As shown in the message flow 340, the UE 102 may initiate a service request procedure by sending a DATA SERVICE REQUEST message 342 to the MME 110 via the AS 202. The UE 102 may also start a timer T3417. The MME 110 and/or the AS 202 may receive the DATA SERVICE REQUEST message 342. The AS 202 may respond with an AS indication message 344 with information about bearer establishment for the user plane. The UE 102 may receive the AS indication message 344, and stop the timer T3417.

As shown in the message flow 360, the UE 102 may initiate a service request procedure by sending a DATA SERVICE REQUEST message 362 to the MME 110 via the AS 202. The UE 102 may also start a timer T3417. The MME 110 may receive the DATA SERVICE REQUEST message 362, and respond with a SERVICE REJECT message 364. For instance, on an unsuccessful transfer of container contents, the MME 110 may send the SERVICE REJECT message 364 to the UE 102. The UE 102 may receive the SERVICE REJECT message 364, and stop the timer T3417.

Figure 4:
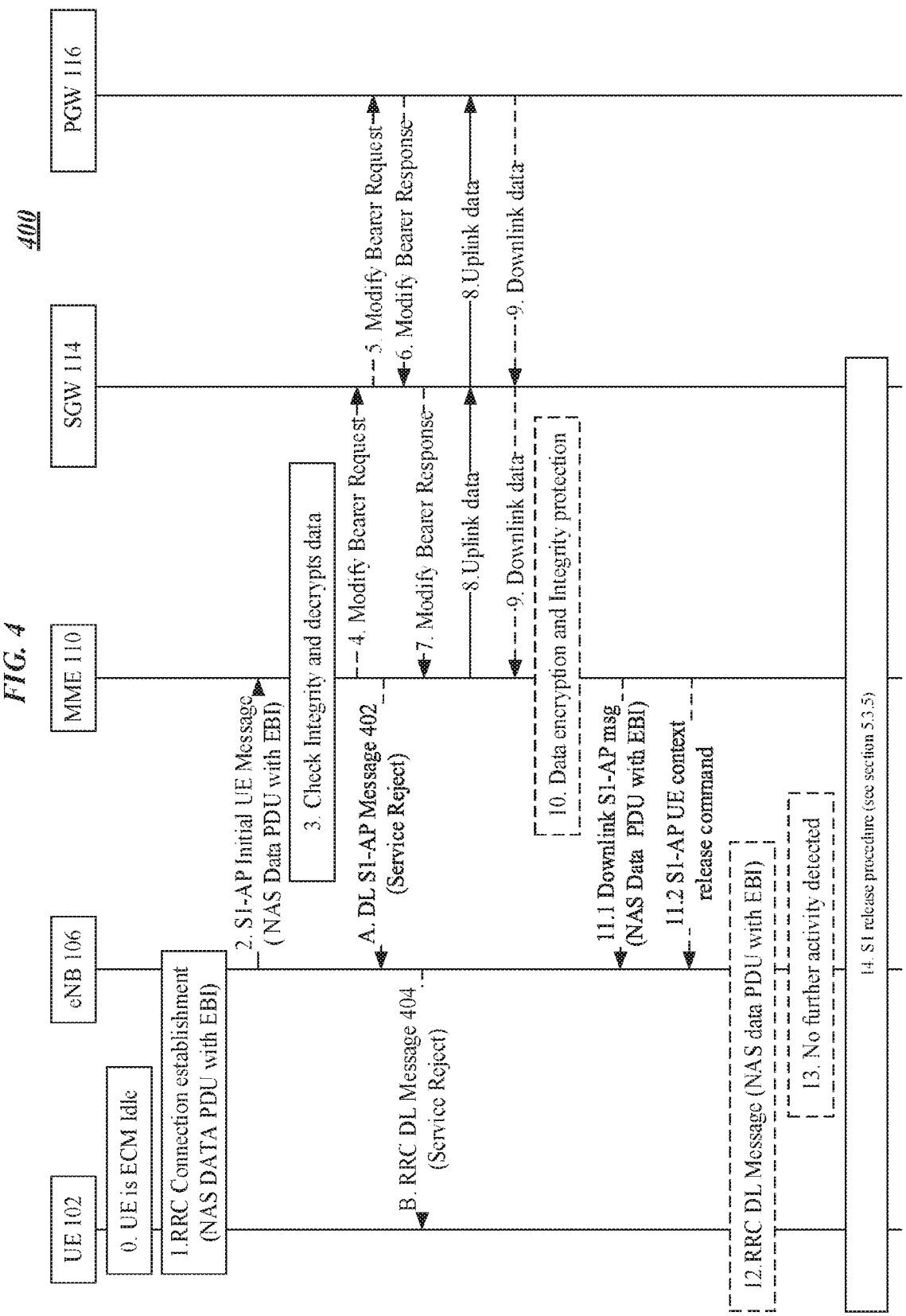
FIG. 4 illustrates an embodiment of a second message flow.

FIG. 4 illustrates a message flow 400 for the communication system 100. The message flow 400 may illustrate a case where the MME 110 utilizes explicit acknowledgements for a DATA SERVICE REQUEST message, such as a SERVICE ACCEPT or a SERVICE REJECT message.

FIG. 4 illustrates part of a message flow shown in 3GPP TSG SA WG2 Meeting #112 titled "Introduction of Control Plane CIoT EPS optimization," Change Request (CR) 2942 to TS 23.401, Revision 13, Current Version 13.5.0, Feb. 23-26, 2016 ("S2-161170"). In stage 2 (S2-161170), the message flow 400 includes message flow operations 1-13 which are similar to those shown in FIG. 5.3.4B.2-1: MO Data transport in NAS PDU according to S2-161170, modified to further show an option for the MME 110 to reject a NAS DATA PDU. One design consideration for a service request procedure is what should be used as a stop criterion for a MO service request procedure. One technique would be to use a layer 2 acknowledgement for successful transmission of a RRC Connection Setup Complete (e.g., Service Request [User data]) as a stop criterion. Using this technique means that at the end of message flow operation 1, the UE 102 assumes that the service request procedure has been completed successfully.

At that point in time, however, the message has not yet reached the MME 110. So it is unknown whether message flow operation 2 will actually be performed successfully, and if so, how the MME 110 will then react. One advantage for re-using a service request procedure in message flow operation 1 is the re-use of an existing handling of unsuccessful and abnormal cases, as described in the 3GPP Stage 3 Specification, sub-clauses 5.6.1.5 and 5.6.1.6. However, according to a description of an unsuccessful case, the MME 110 can respond to a service request with SERVICE REJECT message 402, 404 as shown in message flow operations A, B.

This would indicate when the outcome of the service request procedure was not successful. If that is the case, then it may not be necessary to define receipt of a layer 2 acknowledgement for the initial service request as criterion for successful completion of the service request procedure. Two options can be used as stop criterion for a service request procedure. A first option is use of a supervision timer. A second option is a positive acknowledgement from the MME 110 (e.g., a SERVICE ACCEPT message).

A first option for use as a stop criterion for a service request procedure is use of a supervision timer. The supervision timer should be dimensioned so that the UE 102 can be sure that it will not receive a SERVICE REJECT message after expiry of the timer. For instance, the supervision timer should factor in a time for transfer of a S1AP (e.g., Initial UE (Service Request)) to the MME 110 as shown in message flow operation 2 of the message flow 400. The supervision timer should also factor in some time for processing of the message, which includes detection that a subscriber context is unknown. The supervision timer should also factor in some time for transmission of a SERVICE REJECT message as part of the DL S1-AP message 402 sent from the MME 110 to the eNB 106 (e.g., message flow operation A), and the SERVICE REJECT message as part of a RRC DL message 404 sent from the eNB 106 to the UE 102 (e.g., message flow operation B).

For a final transfer via the radio interface, a worst case scenario should be assumed, which includes a maximum number of retransmissions that can occur under "enhanced coverage" conditions. In contrast, if the MME 110 responds with a SERVICE ACCEPT message, then for message flow operation B the UE 102 will only need to wait for an "average number" of retransmissions, which could be approximately half of a maximum number of retransmissions. A difference between an assumed worst case scenario and an average case the UE 102 will experience in operation will typically be on the order of seconds. For instance, with a SERVICE ACCEPT message, the UE 102 can on average consider a service request procedure as successfully completed several seconds earlier than without such a message.

It is worthy to note that expiry of a supervision timer does not necessarily guarantee that the MME 110 has actually received a DATA SERVICE REQUEST message with user data. If an application sends only one UL packet, and nothing is sent by an application server in return, then a next message the UE 102 is going to receive after having sent the DATA SERVICE REQUEST message is an RRCConnectionRelease message. Currently, this message can only indicate the following ReleaseCauses: loadBalancingTAUrequired, other, and cs-FallbackHighPriority. To provide an indication that the user data has actually been received by the MME 110, a new value for the ReleaseCause can be defined, such as ReleaseCauses: DataReceived. In this case, a corresponding S1AP Cause should be defined as well.

A second option for use as a stop criterion for a service request procedure is use of a positive acknowledgement from the MME 110, such as a SERVICE ACCEPT message. The SERVICE ACCEPT message results in a positive acknowledgement from the MME 110. This provides significant advantages. The SERVICE ACCEPT message adds an explicit synchronization of EPS bearer contexts to the service request procedure. For instance, the UE 102 could include an EPS bearer context status IE in the DATA SERVICE REQUEST message, as it can for an EXTENDED SERVICE REQUEST. The MME 110 could include a same or similar IE in the SERVICE ACCEPT or SERVICE REJECT messages, respectively.

Furthermore, if the UE 102 attempts to send user data via the control plane for an EPS bearer identity, for which the MME 110 does not have an EPS bearer context and/or PDN connection, then the MME 110 could respond with the following messages:

1. SERVICE REJECT (EMM cause="implicitly detached"), if this was the last PDN connection and the MME does not support EMM-REGISTERED without PDN connection;
2. SERVICE REJECT (EMM cause="ESM failure", [ESM Status (ESM cause="invalid EPS bearer identity")]) and release the RRC connection; and/or
3. SERVICE ACCEPT (EMM cause="ESM failure", [ESM Status (ESM cause="invalid EPS bearer identity")]) and keep the RRC connection to enable the UE to reactivate the PDN connection.

FIG. 5 illustrates a block diagram of an apparatus 500. Apparatus 500 may be representative of a UE that implements techniques for UE initiated IP flow mobility and/or responding to network initiated IP flow mobility. As such, apparatus 500 may implement portions of the message flows described in relation to FIGS. 2-4 that involve the UE 102 as described therein, including the generation, transmission, reception, and processing of messages involving the UE 102.

As shown in FIG. 5, apparatus 500 can comprise multiple elements including a processor circuit 502, a memory unit 504, a communications component 506, and a management component 508. The embodiments, however, are not limited to the type, number, or arrangement of elements shown in this figure.

In some embodiments, apparatus 500 may comprise processor circuit 302. Processor circuit 502 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 502 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 502 may be implemented as a general purpose processor, such as a processor made by Intel® Corporation, Santa Clara, Calif. The embodiments are not limited in this context.

In various embodiments, apparatus 500 may comprise or be arranged to communicatively couple with a memory unit 504. Memory unit 504 may be implemented using any machine-readable or computer-readable media capable of storing data, including both volatile and non-volatile memory. For example, memory unit 504 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 504 may be included on the same integrated circuit as processor circuit 502, or alternatively some portion or all of memory unit 504 may be disposed on an integrated circuit or other medium, for example a hard disk drive, that is external to the integrated circuit of processor circuit 502. Although memory unit 504 is comprised within apparatus 500 in FIG. 5, memory unit 504 may be external to apparatus 500 in some embodiments. The embodiments are not limited in this context.

In various embodiments, apparatus 500 may comprise a communications component 506. Communications component 506 may comprise logic, circuitry, and/or instructions operative to send messages to one or more remote devices and/or to receive messages from one or more remote devices. In some embodiments, communications component 506 may be operative to send and/or receive messages over one or more wired connections, one or more wireless connections, or a combination of both. In various embodiments, communications component 506 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 500 may comprise a management component 508. Management component 508 may comprise logic, circuitry, and/or instructions operative to manage functional operations of the apparatus 500 including directing the communications component 506 to generate and transmit messages and/or to receive and process messages. The embodiments are not limited in this context.

FIG. 5 also illustrates a block diagram of a system 520. System 520 may comprise any of the aforementioned elements of apparatus 500. System 520 may further comprise a radio frequency (RF) transceiver 522. RF transceiver 522 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver 522 may operate in accordance with one or more applicable standards in any version. The embodiments are not limited in this context.

In various embodiments, system 520 may comprise one or more RF antennas 524. Examples of any particular RF antenna 524 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In some embodiments, RF transceiver 522 may be operative to send and/or receive messages and/or data using one or more RF antennas 524. The embodiments are not limited in this context.

In various embodiments, system 520 may comprise a display 526. Display 526 may comprise any display device capable of displaying information received from processor circuit 502. Examples for display 526 may include a television, a monitor, a projector, and a computer screen. In one embodiment, for example, display 526 may be implemented by a liquid crystal display (LCD), light emitting diode (LED) or other type of suitable visual interface. Display 526 may comprise, for example, a touch-sensitive display screen ("touchscreen"). In some implementations, display 526 may comprise one or more thin-film transistors (TFT) LCD including embedded transistors. The embodiments, however, are not limited to these examples.

In various embodiments, communications component 506 may be operative to transmit and receive messages with an eNB 106, as depicted and described in relation to FIGS. 1-4. Communication with the eNB 106 can be implemented over a wireless connection 530 (e.g., a wireless data connection) in accordance with one or more cellular communication protocols. The eNB 106 may be operative to transmit and receive messages with the MME 110, as depicted and described in relation to FIGS. 1-4. Communication with the MME 110 can be implemented using a connection 540 (e.g., wired or wireless data connections) in accordance with one or more cellular communication protocols and/or network protocols.

In various embodiments, the management component 508 may implement techniques to improve service request procedures service request procedure in the communication system 100 arranged in accordance with the 3GPP Stage 3 Specification. The management component 508 can include a service request component 510.

In one embodiment, for example, the service request component 510 may be implemented by the UE 102 as the apparatus 500 and/or system 520. The service request component 510 may comprise computer-readable storage media having stored thereon instructions for execution by the processor circuitry 502. The instructions, when executed by the processor circuitry of the UE 102 operating in an EMM-IDLE mode and configured to use EPS services with control plane CIoT EPS optimization, may determine to initiate a service request procedure to enable a transfer of user data via a control plane. The service request component 510 may generate a message used by the service request procedure 512 that contains a service type IE 514. The service type IE 514 may comprise a service type value 515 set to indicate either a mobile originating (MO) request or a mobile terminating (MT) request. The service request component 510 may send the service request message 512 to the MME 110 via the eNB 106, in order to initiate the service request procedure. An example of a service request message 512 may comprise a DATA SERVICE REQUEST message. Embodiments are not limited to this example.

In one embodiment, the service request component 510 may identify user data to be sent to the MME 110. The service request component 510 may include an ESM DATA TRANSPORT (EDT) message 517 in the service request message 512, the ESM DATA TRANSPORT message 517 to comprise the user data.

In one embodiment, the service request component 510 may generate the service request message 512 to include an ESM message container IE 516 containing the ESM DATA TRANSPORT message 517.

In one embodiment, the service request component 510 may determine to initiate the service request procedure in response to a determination that uplink user data is pending at the UE. The service request component 510 may set the service type value 515 to indicate a MO request.

In one embodiment, the service request component 510 may determine to initiate the service request procedure in response to receipt of a paging message. The service request component 510 may set the service type value 515 to indicate a MT request.

In one embodiment, the service request component 510 may determine that the service request procedure has been successfully completed based on receipt of a security protected non-NAS message 518 from the MME 110. For example, the security protected NAS message 518 may comprise a service accept message, a security mode command message, an ESM data transport message, a service reject message, or other type of service request procedure message. Embodiments are not limited in this context.

In one embodiment, the service request component 510 may identify one or more EPS bearer contexts that an EPS bearer context status IE comprised in the service accept message indicates as being inactive. The service request component 510 may locally deactivate the identified one or more EPS bearer contexts.

In one embodiment, the service request component 510 may cause the UE 102 to enter an EMM-REGISTERED state in response to a determination that the service request procedure has been successfully completed.

In one embodiment, the service request component 510 may reset a service request attempt counter in response to a determination that the service request procedure has been successfully completed.

In one embodiment, the service request component 510 may control a timer T3417 for the service request procedure. For instance, the service request component 510 may start the timer T3417 when a service request message is sent. The service request component 510 may stop the timer T3417 in response to a determination that the service request procedure has been successfully completed.

Figure 6:
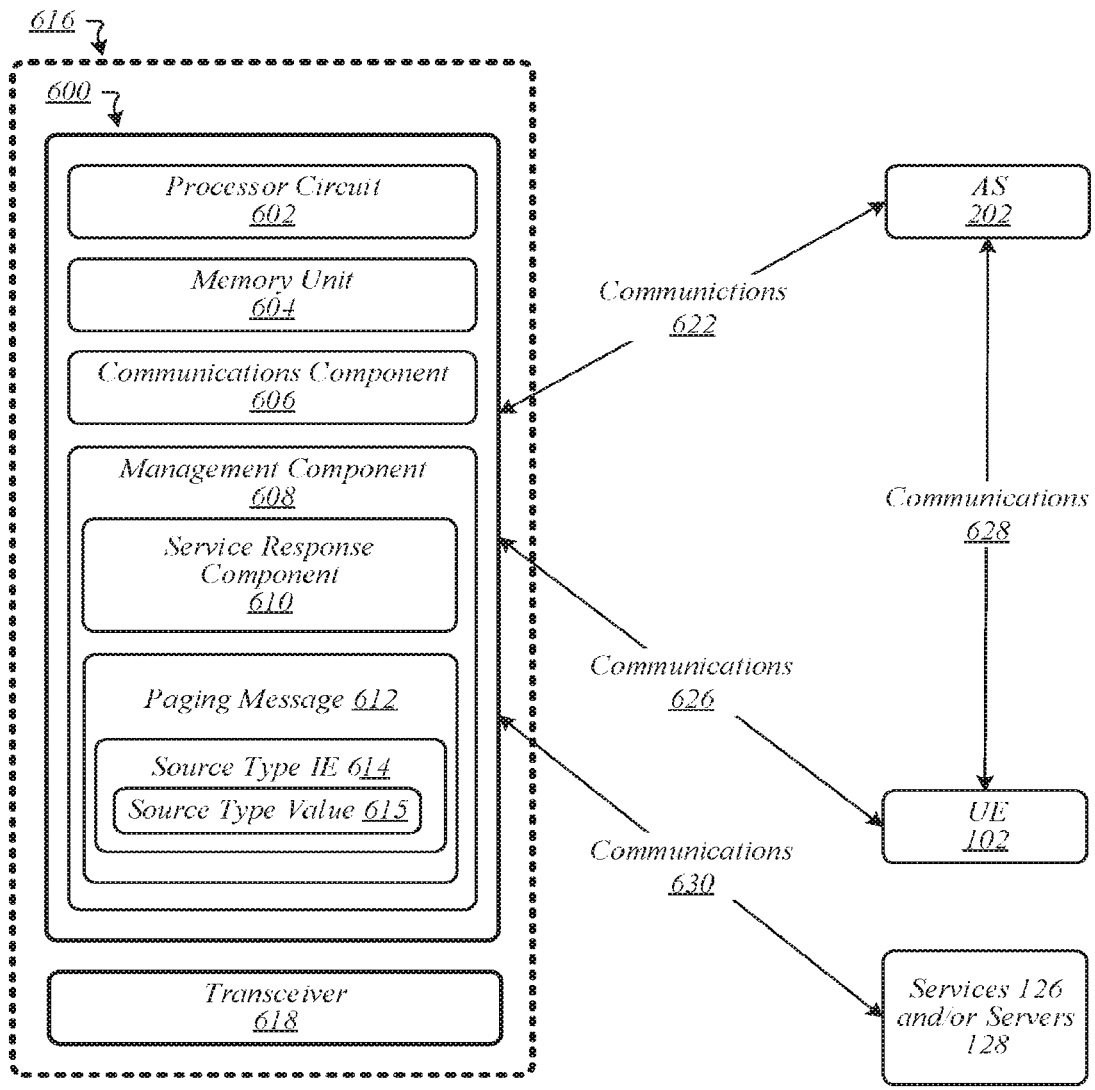
FIG. 6 illustrates an embodiment of a second apparatus and system.

FIG. 6 illustrates a block diagram of an apparatus 600. Apparatus 600 may be representative of the MME 110 and/or the AS 202 that implements techniques for service request procedures. As such, apparatus 600 may implement portions of the message flows described in relation to FIGS. 2-4 that involve the MME 110 and/or the AS 202 as described therein, including the generation, transmission, reception and processing of messages involving the MME 110 and/or the AS 202. As shown in FIG. 6, apparatus 600 can comprise multiple elements including a processor circuit 602, a memory unit 604, a communications component 606, and a discovery management component 608. The embodiments, however, are not limited to the type, number, or arrangement of elements shown in this figure.

In some embodiments, the apparatus 600 may comprise processor circuit 602. Processor circuit 602 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 602 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 602 may be implemented as a general purpose processor, such as a processor made by Intel® Corporation, Santa Clara, Calif. The embodiments are not limited in this context.

In various embodiments, apparatus 600 may comprise or be arranged to communicatively couple with a memory unit 604. Memory unit 604 may be implemented using any machine-readable or computer-readable media capable of storing data, including both volatile and non-volatile memory. For example, memory unit 604 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 604 may be included on the same integrated circuit as processor circuit 602, or alternatively some portion or all of memory unit 604 may be disposed on an integrated circuit or other medium, for example a hard disk drive, that is external to the integrated circuit of processor circuit 602. Although memory unit 604 is comprised within apparatus 600 in FIG. 6, memory unit 604 may be external to apparatus 600 in some embodiments. The embodiments are not limited in this context.

In various embodiments, apparatus 600 may comprise a communications component 606. Communications component 606 may comprise logic, circuitry, and/or instructions operative to send messages to one or more remote devices and/or to receive messages from one or more remote devices. In some embodiments, communications component 606 may be operative to send and/or receive messages over one or more wired connections, one or more wireless connections, or a combination of both. In various embodiments, communications component 606 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 600 may comprise a management component 608. Management component 608 may comprise logic, circuitry, and/or instructions operative to manage functional operations of the apparatus 600 including directing the communications component 606 to generate and transmit messages and/or to receive and process messages. The embodiments are not limited in this context.

FIG. 6 also illustrates a block diagram of a system 616. System 616 may comprise any of the aforementioned elements of apparatus 600. System 616 may further comprise a transceiver 618. Transceiver may be capable of transmitting and receiving signals using various suitable communications techniques. Such techniques may involve communications across one or more wired networks. In communicating across such networks, the transceiver 618 may operate in accordance with one or more applicable standards in any version. The embodiments are not limited in this context.

Figure 3:
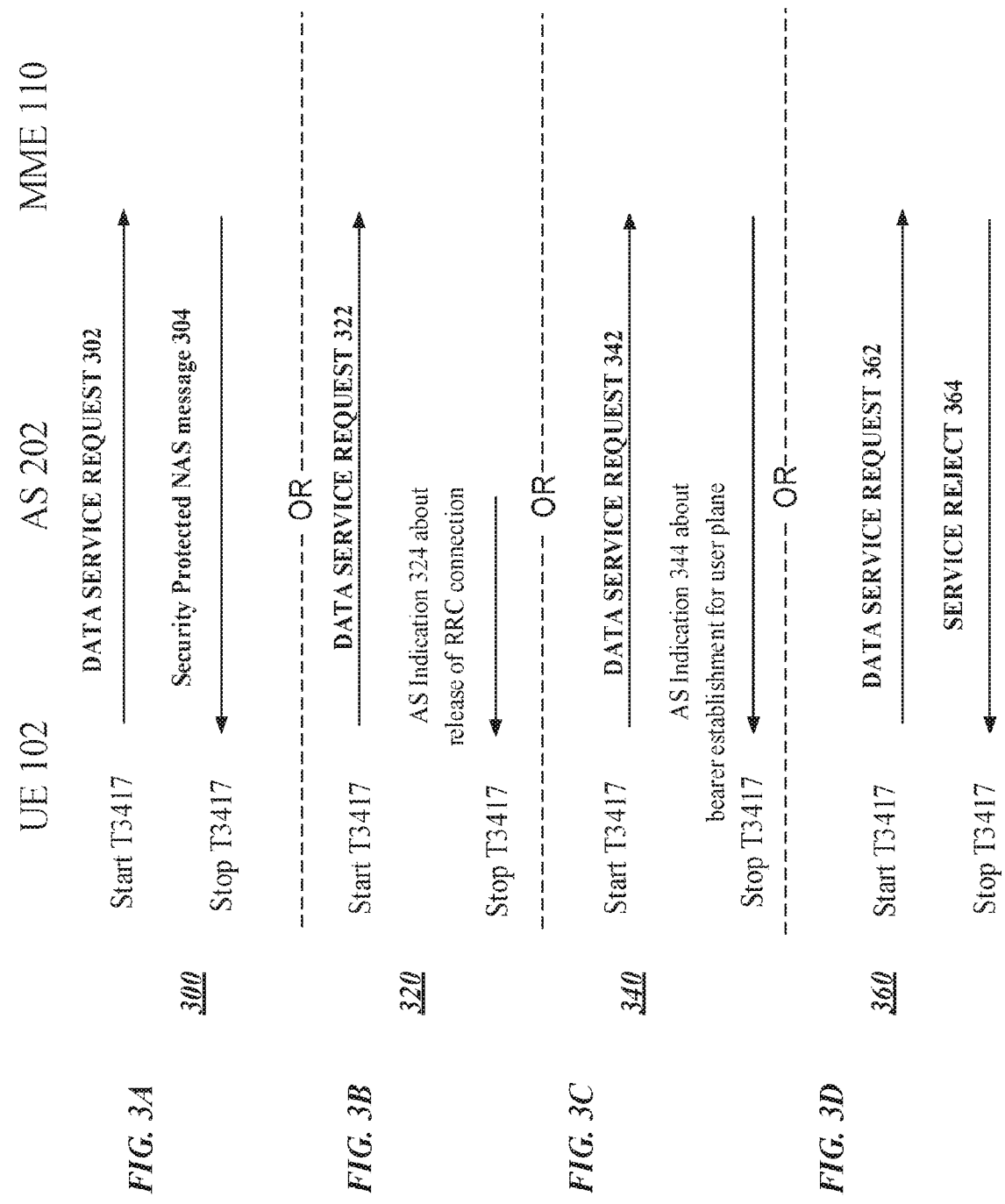
FIGS. 3A-D illustrates embodiments of additional message flows.

In various embodiments, communications component 606 may be operative to transmit and receive messages with AS 202 as depicted and described in relation to FIGS. 2-4. Communication with the AS 202 can be implemented over a communications link 622 as referenced in relation to the message flows depicted and described in relation to FIGS. 2-4. Further, the communications component 606 may be operative to transmit and receive messages with the UE 102 as depicted and described in relation to FIGS. 2-5. Communication with the UE 102 can be implemented using a communications link 626 as referenced in relation to the message flows depicted and described in relation to FIGS. 2-4. Similarly, the UE 102 and AS 202 can communicate over the communications link 628 as referenced in relation to the message flows depicted and described in relation to FIGS. 2-4. Communications component 606 may also be operative to transmit and receive messages with the IP services 126 and/or servers 128 of the communication system 100 as depicted and described in relation to FIG. 1.

In various embodiments, the management component 608 may implement techniques to improve service request procedures and service request procedures in the communication system 100 arranged in accordance with the 3GPP Stage 3 Specification. The management component 608 can include a service response component 610.

In one embodiment, for example, the service response component 610 may be implemented by the MME 110 as the apparatus 600 and/or system 616. The service response component 610 may comprise computer-readable storage media having stored thereon instructions for execution by the processor circuit 602. The instructions, when executed by the processor circuit 602 of the MME 110 configured to use EPS services with control plane CIoT EPS optimization, may access a service request message 512 received from the UE 102 via the transceiver 618. The service request message may contain a service type IE 514. The service response component 610 may identify a service type value 515 within the service type IE 514. The service response component 610 may initiate a transport of user data to the UE 102 via a control plane in response to a determination that the service type value 515 indicates a MT request.

In one embodiment, for example, the service response component 610 may send an ESM data transport message 517 to the UE 102, with the ESM data transport message 517 containing the user data.

In one embodiment, for example, the service response component 610 may detect a presence of an ESM message container IE 516 within the service request message 512. The service response component 610 may forward contents of the ESM message container IE 516. The contents of the ESM message container UE 516 may comprise the ESM data transport message 517 containing user data originating from the UE 102.

In one embodiment, for example, the service response component 610 may send a security protected non-NAS message 518 to the UE 102. For example, the security protected NAS message 518 may comprise a SERVICE ACCEPT message, a security mode command message, an ESM DATA TRANSPORT message, a SERVICE REJECT message, or other type of service request procedure message. A particular type of security protected NAS message 518 sent may be selected, in part, as a result of a determination that a service request procedure has been successfully completed or unsuccessfully completed.

As previously discussed, a network element may also initiate or invoke service request procedures as well. This can be accomplished, for example, through a paging procedure. In one embodiment, for example, the management component 608 of the MME 110 may send a paging message 612 to the UE 102 in order to initiate or invoke service request procedures. The paging message 612 may optionally include a source type IE 614. The source type IE 614 may include a source type value 615. The source type value 615 may indicate a source of downlink data. Examples of sources of downlink data may include without limitation a PGW 116 or SCEF 118. Alternatively, the management component 608 may send a paging message 612 without the source type IE 614 and source type value 615, or with the source type IE 614 and the source type value 615 set to a default value indicating there is no source of downlink data identified by the source type IE 614.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7A:
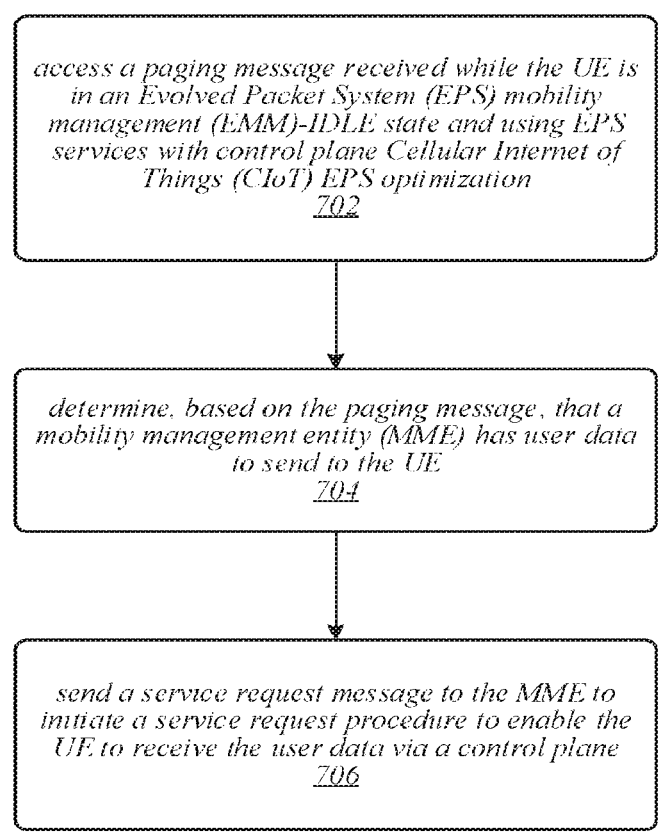
FIGS. 7A-B illustrate embodiments of logic flows.

FIG. 7A illustrates an example of a logic flow 700 that may be representative of one or more of the disclosed air interface resource utilization techniques for wireless communication networks according to various embodiments. For example, logic flow 700 may be representative of operations that may be performed by the UE 102 as depicted and described in FIGS. 1-4.

As shown in FIG. 7A, the logic flow 700 may access a paging message received while the UE is in an Evolved Packet System (EPS) mobility management (EMM)-IDLE state and using EPS services with control plane Cellular Internet of Things (CIoT) EPS optimization at block 702. For instance, the UE 102 may access a paging message 612 received while the UE 102 is in an EMM-IDLE state and using EPS services with control plane CIoT EPS optimization in accordance with one or more 3GPP techniques.

The logic flow 700 may determine, based on the paging message, that a MME has user data to send to the UE at block 704. For instance, the UE 102 may determine, based on the paging message 612, that the MME 110 has user data to send to the UE 102.

The logic flow 700 may send a service request message to the MME to initiate a service request procedure to enable the UE to receive the user data via a control plane at block 706. For instance, the UE 102 may send a service request message 512 to the MME 110 to initiate a service request procedure to enable the UE 102 to receive the user data via a control plane of the wireless connections 530, 540.

Figure 7B:
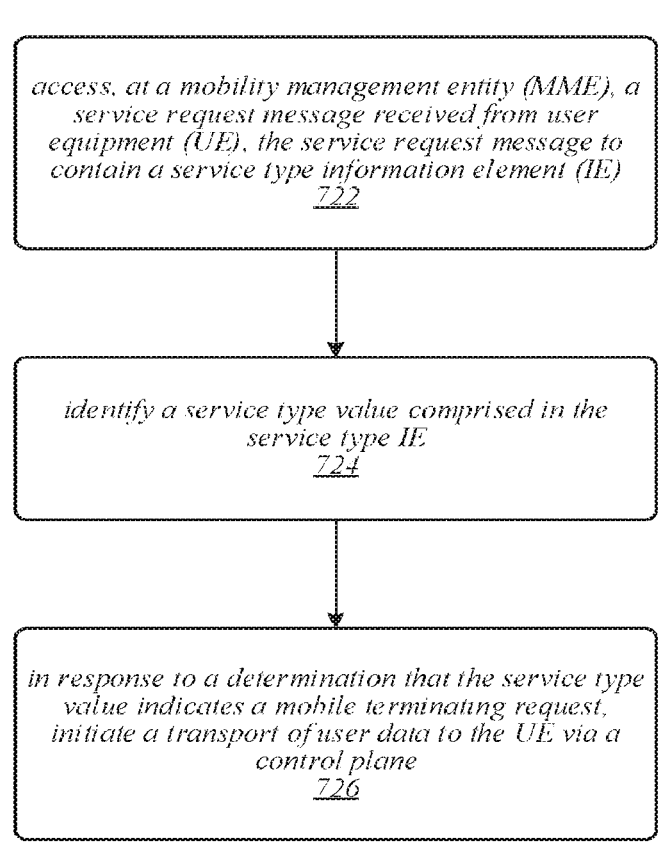

FIG. 7B illustrates an example of a logic flow 720 that may be representative of one or more of the disclosed air interface resource utilization techniques for wireless communication networks according to various embodiments. For example, logic flow 720 may be representative of operations that may be performed by the MME 110 and/or the AS 202 as depicted and described in FIGS. 1-4.

As shown in FIG. 7B, the logic flow 720 may access, at a mobility management entity (MME), a service request message received from user equipment (UE), the service request message to contain a service type information element (IE) at block 722. For instance, the MME 110 may access a service request message 512 received from the UE 102, the service request message 512 to contain a service type IE 514.

The logic flow 720 may identify a service type value comprised in the service type IE at block 724. For instance, the MME 110 may identify a service type value 515 indicted in the service type IE 514.

The logic flow 720 may initiate a transport of user data to the UE via a control plane in response to a determination that the service type value indicates a mobile terminating request at block 726. For instance, the MME 110 may initiate a transport of user data to the UE 102 via a control plane in response to a determination that the service type value 515 indicates a MT request.

As previously discussed, various embodiments may implement techniques to improve service request procedures in a wireless network arranged in accordance with the 3GPP Stage 3 Specification. In one embodiment, for example, updates to the 3GPP Stage 3 Specification may comprise the following description.

5.6.1.2 Service Request Procedure Initiation
5.6.1.2.2 UE is Using EPS Services with CP-CIoT EPS Optimization The UE shall send a DATA SERVICE REQUEST message, start T3417 and enter the state EMM-SER VICE-REQUEST-INITIATED.

For case a in subclause 5.6.1.1, the data service type of the DATA SERVICE REQUEST message shall indicate "mobile terminating request". The UE shall set the length indicator of the ESM message container IE to zero and not include any ESM message.

For case b in subclause 5.6.1.1, the data service type of the DATA SERVICE REQUEST message shall indicate "mobile originating request". The UE shall include an ESM DATA TRANSPORT message in the ESM message container IE.

For case c in subclause 5.6.1.1, the data service type of the DATA SERVICE REQUEST message shall indicate "mobile originating request". The UE shall set the length indicator of the ESM message container IE to zero and not include any ESM message.

5.6.1.4.2 UE is Using EPS Services with CP-CIoT EPS Optimization

For case a in subclause 5.6.1.1, upon receipt of the DATA SERVICE REQUEST message with data service type indicating "mobile terminating request", the MME may:
1) initiate the transport of user data via the control plane procedure or any other NAS signalling procedure; or
2) if supported by the UE and required by the network, initiate the setup of the user plane radio bearer(s).

For case b in subclause 5.6.1.1, upon receipt of the DATA SERVICE REQUEST message with data service type indicating "mobile originating request" and with a non-empty ESM message container IE, the MME shall forward the contents of the ESM message container IE to the ESM layer. After completion of the EMM common procedures according to subclause 5.6.1.3, if any, the MME may:
1) upon receipt of an "end-of-data-exchange" indication from the ESM layer (see subclause 6.6.X.2 [CR 2324]), unless the MME has additional downlink user data or signalling pending, initiate release of the NAS signalling connection;
2) if downlink user data are pending, send an ESM DATA TRANSPORT message to the UE or, if supported by the UE and required by the network, initiate the setup of the user plane radio bearer(s);
3) if downlink signalling is pending, send a signalling message to the UE; or
4) if no EMM common procedures were initiated and no downlink user data or signalling are pending, or if the MME needs to perform an EPS bearer context status synchronization, send a SERVICE ACCEPT message.

For case c in subclause 5.6.1.1, upon receipt of the DATA SERVICE REQUEST message with data service type indicating "mobile originating request" and with an empty ESM message container IE, after completion of the EMM common procedures according to subclause 5.6.1.3, if any, the MME may:
1) if downlink user data are pending, send an ESM DATA TRANSPORT message to the UE or, if supported by the UE and required by the network, initiate the setup of the user plane radio bearer(s);
2) if downlink signalling is pending, send a signalling message to the UE; or
3) if no EMM common procedures were initiated and no downlink user data or signalling are pending, or if the MME needs to perform an EPS bearer context status synchronization, send a SERVICE ACCEPT message.

For cases a, b and c in subclause 5.6.1.1, if the EPS bearer context status IE is included in the DATA SERVICE REQUEST message, the network shall deactivate all those EPS bearer contexts locally (without peer-to-peer signalling between the network and the UE) which are active on the network side but are indicated by the UE as being inactive. If a default EPS bearer context is marked as inactive in the EPS bearer context status IE included in the DATA SERVICE REQUEST message, and this default bearer is not associated with the last PDN connection of the UE in the MME, the MME shall locally deactivate all EPS bearer contexts associated to the PDN connection with the default EPS bearer context without peer-to-peer ESM signalling to the UE. If the default bearer is associated with the last remaining PDN connection of the UE in the MME, and EMM-REGISTERED without PDN connection is supported by the UE and the MME, the MME shall locally deactivate all EPS bearer contexts associated to the PDN connection with the default EPS bearer context without peer-to-peer ESM signalling to the UE.

If the EPS bearer context status IE is included in the DATA SERVICE REQUEST, the MME shall include an EPS bearer context status IE in the SERVICE ACCEPT message, indicating which EPS bearer contexts are active in the MME except for the case no EPS bearer context exists on the network side.

If the MME needs to initiate an EPS bearer context status synchronization, the MME may include an EPS bearer context status IE in the SERVICE ACCEPT message also if no EPS bearer context status IE was included in the DATA SERVICE REQUEST message.

For cases a, b and c in subclause 5.6.1.1, the UE shall treat the receipt of a security protected NAS message or the indication from the lower layers that the user plane radio bearers are set up as successful completion of the procedure. The UE shall reset the service request attempt counter, stop the timer T3417 and enter the state EMM-REGISTERED.

NOTE: The security protected NAS message can be e.g. a SECURITY MODE COMMAND, SERVICE ACCEPT or ESMDATA TRANSPORT message.

For case b in subclause 5.6.1.1 the UE shall also treat the indication from the lower layers that the RRC connection has been released as successful completion of the procedure. The UE shall reset the service request attempt counter, stop the timer T3417 and enter the state EMM-REGISTERED.

Editor's note [WI CIoT-CT; CR #2395]: For cases a and c, an RRC connection release in response to a DATA SERVICE REQUEST can be considered as abnormal case. The details are FFS.

For cases a, b and c in subclause 5.6.1.1, if the UE receives an EPS bearer context status IE included in the SERVICE ACCEPT message, the UE shall deactivate all those EPS bearers contexts locally (without peer-to-peer signaling between the UE and the MME) which are active in the UE, but are indicated by the MME as being inactive. If a default EPS bearer context is marked as inactive in the EPS bearer context status IE included in the SERVICE ACCEPT message, and this default bearer is not associated with the last remaining PDN connection in the UE, the UE shall locally deactivate all EPS bearer contexts associated to the PDN connection with the default EPS bearer context without peer-to-peer ESM signaling to the MME. If the default bearer is associated with the last remaining PDN connection of the UE in the MME, and EMM-REGISTERED without PDN connection is supported by the UE and the MME, the UE shall locally deactivate all EPS bearer contexts associated to the PDN connection with the default EPS bearer context without peer-to-peer ESM signaling to the MME.

If an EPS bearer context status IE is included in the SERVICE ACCEPT message, the UE may choose to ignore all those EPS bearers which are indicated by the MME as being active, but are inactive at the UE.

8.2.Y Service Accept
8.2.Y.1 Message Definition

This message is sent by the network in response to the Data Service Request message. See table 8.2.Y.1.

Message type: SERVICE ACCEPT
Significance: dual
Direction: network to UE

TABLE 8.2.Y.1

SERVICE ACCEPT message content

| IEI | Information Element | Type/Reference | Presence | Format | Length |
|---|---|---|---|---|---|
|  | Protocol discriminator | Protocol discriminator 9.2 | M | V | ½ |
|  | Security header type | Security header type 9.3.1 | M | V | ½ |
|  | Service accept message identity | Message type 9.8 | M | V | 1 |
| 57 | EPS bearer context status | EPS bearer context status 9.9.2.1 | O | TLV | 4 |

8.2.Y.2 EPS Bearer Context Status

This IE shall be included if the network wants to indicate the EPS bearer contexts that are active for the UE in the network.

FIG. 8 illustrates an embodiment of a storage medium 800. Storage medium 800 may comprise any non-transitory computer-readable storage medium or machine-readable storage medium, such as an optical, magnetic or semiconductor storage medium. In various embodiments, storage medium 800 may comprise an article of manufacture. In some embodiments, storage medium 800 may store computer-executable instructions, such as computer-executable instructions to implement logic for the message flows 200, 300, 320, 340 and/or 360 of FIGS. 2-4, and/or the logic flow 700 of FIG. 7A. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

FIG. 8 also illustrates an embodiment of a storage medium 850. Like storage medium 800, storage medium 850 may comprise any non-transitory computer-readable storage medium or machine-readable storage medium, such as an optical, magnetic or semiconductor storage medium. Examples of such a computer-readable storage medium or machine-readable storage medium may include—without limitation—any of the examples mentioned above in reference to storage medium 800. In various embodiments, storage medium 850 may comprise an article of manufacture. In some embodiments, storage medium 850 may store computer-executable instructions, such as computer-executable instructions to implement logic for the message flows 200, 300, 320, 340 and/or 360 of FIGS. 2-4, and/or the logic flow 720 of FIG. 7B. Examples of such computer-executable instructions may include—without limitation—any of the examples mentioned above in reference to storage medium 800. The embodiments are not limited in this context.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 9:
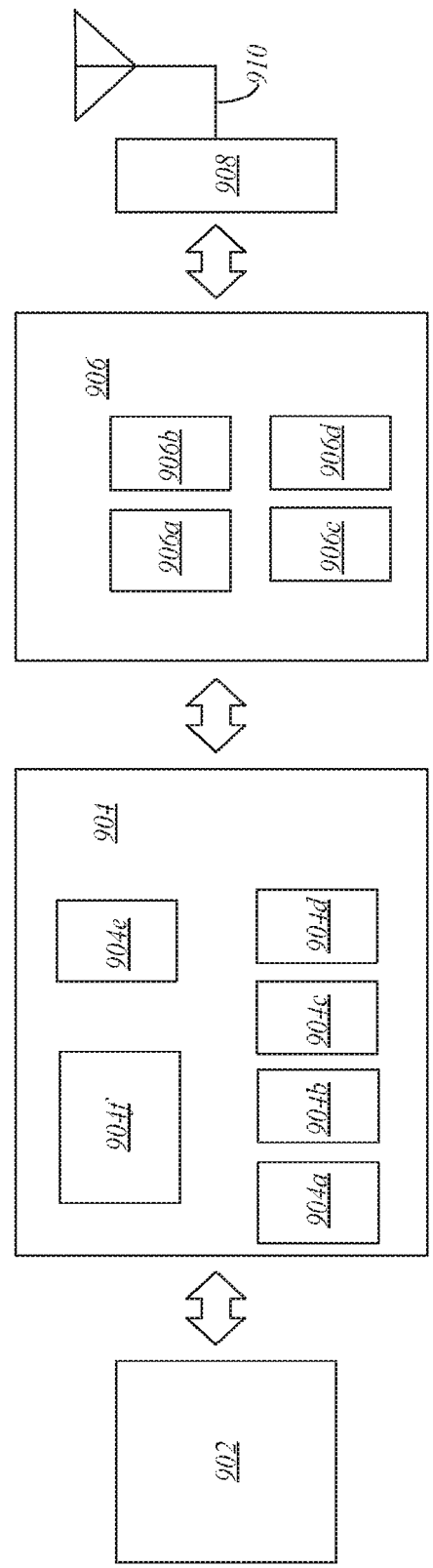
FIG. 9 illustrates an embodiment of user equipment.

FIG. 9 illustrates an example of a UE device 900 that may be representative of a UE that implements one or more of the disclosed air interface resource utilization techniques for wireless communication networks according to various embodiments. For example, UE device 900 may be representative of NB-UE 104 according to some embodiments. In some embodiments, the UE device 900 may include application circuitry 902, baseband circuitry 904, Radio Frequency (RF) circuitry 906, front-end module (FEM) circuitry 908 and one or more antennas 910, coupled together at least as shown.

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/ storage to enable various applications and/or operating systems to run on the system. 1o The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature down conversion and/or up conversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct down conversion and/or direct up conversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 may include additional elements such as, for example, memory/storage, display, camera, sensor, and/or input/output (I/O) interface.

Figure 10:
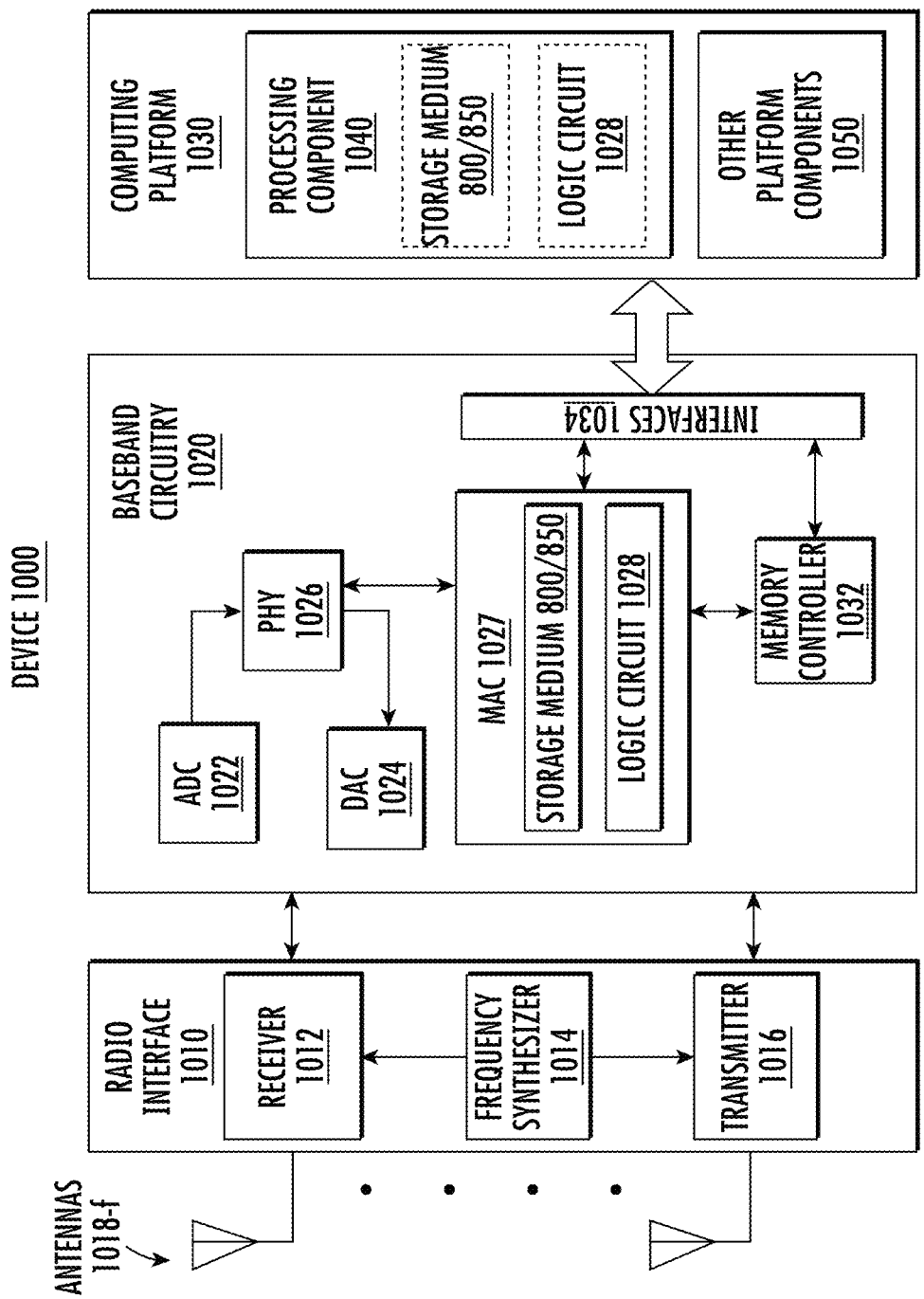
FIG. 10 illustrates an embodiment of a device.

FIG. 10 illustrates an embodiment of a communications device 1000 that may implement one or more of UE 102, eNB 106, MME 110, AS 202, core network 108, server 128, message flows 200, 300, 320, 340, 360, logic flow 700, logic flow 720, storage medium 800, storage medium 850, and UE 900. In various embodiments, device 1000 may comprise a logic circuit 1028. The logic circuit 1028 may include physical circuits to perform operations described for one or more of UE 102, eNB 106, MME 110, AS 202, core network 108, server 128, message flows 200, 300, 320, 340, 360, logic flow 700, logic flow 720, storage medium 800, storage medium 850, and UE 900, for example. As shown in FIG. 10, device 1000 may include a radio interface 1010, baseband circuitry 1020, and computing platform 1030, although the embodiments are not limited to this configuration.

The device 1000 may implement some or all of the structure and/or operations for one or more of UE 102, eNB 106, MME 110, AS 202, core network 108, server 128, message flows 200, 300, 320, 340, 360, logic flow 700, logic flow 720, storage medium 800, storage medium 850, and UE 900, and logic circuit 1028 in a single computing entity, such as entirely within a single device. Alternatively, the device 1000 may distribute portions of the structure and/or operations for one or more of UE 102, eNB 106, MME 110, AS 202, core network 108, server 128, message flows 200, 300, 320, 340, 360, logic flow 700, logic flow 720, storage medium 800, storage medium 850, and UE 900, and logic circuit 1028 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1010 may include, for example, a receiver 1012, a frequency synthesizer 1014, and/or a transmitter 1016. Radio interface 1010 may include bias controls, a crystal oscillator and/or one or more antennas 1018-f In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, a mixer for down-converting received RF signals, an analog-to-digital converter 1022 for converting analog signals to digital form, a digital-to-analog converter 1024 for converting digital signals to analog form, and a mixer for up-converting signals for transmission. Further, baseband circuitry 1020 may include a baseband or physical layer (PHY) processing circuit 1026 for PHY link layer processing of respective receive/transmit signals. Baseband circuitry 1020 may include, for example, a medium access control (MAC) processing circuit 1027 for MAC/data link layer processing. Baseband circuitry 1020 may include a memory controller 1032 for communicating with MAC processing circuit 1027 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames. Alternatively or in addition, MAC processing circuit 1027 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for one or more of UE 102, eNB 106, MME 110, AS 202, core network 108, server 128, message flows 200, 300, 320, 340, 360, logic flow 700, logic flow 720, storage medium 800, storage medium 850, and UE 900, and logic circuit 1028 using the processing component 1040. The processing component 1040 (and/or PHY 1026 and/or MAC 1027) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired.

Embodiments of device 1000 may be implemented using single input single output (SISO) architectures. However, certain implementations may include multiple antennas (e.g., antennas 1018-f) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

FIG. 11 illustrates an embodiment of a broadband wireless access system 1100. As shown in FIG. 11, broadband wireless access system 1100 may be an internet protocol (IP) type network comprising an internet 1110 type network or the like that is capable of supporting mobile wireless access and/or fixed wireless access to internet 1110. In one or more embodiments, broadband wireless access system 1100 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1100, radio access networks (RANs) 1112 and 1118 are capable of coupling with evolved node Bs (eNBs) 1114 and 1120, respectively, to provide wireless communication between one or more fixed devices 1116 and internet 1110 and/or between or one or more mobile devices 1122 and Internet 1110. One example of a fixed device 1116 and a mobile device 1122 is device 1000 of FIG. 10, with the fixed device 1116 comprising a stationary version of device 1000 and the mobile device 1122 comprising a mobile version of device 1000. RANs 1112 and 1118 may implement profiles that are capable of defining the mapping of network functions to one or more physical entities on broadband wireless access system 1100. eNBs 1114 and 1120 may comprise radio equipment to provide RF communication with fixed device 1116 and/or mobile device 1122, such as described with reference to device 1000, and may comprise, for example, the PHY and MAC layer equipment in compliance with a 3GPP LTE Specification or an IEEE 802.16 Standard. eNBs 1114 and 1120 may further comprise an IP backplane to couple to Internet 1110 via RANs 1112 and 1118, respectively, although the scope of the claimed subject matter is not limited in these respects.

Broadband wireless access system 1100 may further comprise a visited core network (CN) 1124 and/or a home CN 1126, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1124 and/or home CN 1126, and the scope of the claimed subject matter is not limited in these respects. Visited CN 1124 may be referred to as a visited CN in the case where visited CN 1124 is not part of the regular service provider of fixed device 1116 or mobile device 1122, for example where fixed device 1116 or mobile device 1122 is roaming away from its respective home CN 1126, or where broadband wireless access system 1100 is part of the regular service provider of fixed device 1116 or mobile device 1122 but where broadband wireless access system 1100 may be in another location or state that is not the main or home location of fixed device 1116 or mobile device 1122. The embodiments are not limited in this context.

Fixed device 1116 may be located anywhere within range of one or both of eNBs 1114 and 1120, such as in or near a home or business to provide home or business customer broadband access to Internet 1110 via eNBs 1114 and 1120 and RANs 1112 and 1118, respectively, and home CN 1126. It is worthy of note that although fixed device 1116 is generally disposed in a stationary location, it may be moved to different locations as needed. Mobile device 1122 may be utilized at one or more locations if mobile device 1122 is within range of one or both of eNBs 1114 and 1120, for example. In accordance with one or more embodiments, operation support system (OSS) 1128 may be part of broadband wireless access system 1100 to provide management functions for broadband wireless access system 1100 and to provide interfaces between functional entities of broadband wireless access system 1100. Broadband wireless access system 1100 of FIG. 11 is merely one type of wireless network showing a certain number of the components of broadband wireless access system 1100, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

In a first example, an apparatus may comprise processing circuitry; and computer-readable storage media having stored thereon instructions for execution by the processing circuitry to: determine, at user equipment (UE) operating in an Evolved Packet System (EPS) mobility management (EMM)-IDLE mode and configured to use EPS services with control plane Cellular Internet of Things (CIoT) EPS optimization, to initiate a service request procedure to enable a transfer of user data via a control plane; generate a service request message that contains a service type information element (IE) comprising a service type value set to indicate either a mobile originating request or a mobile terminating request; and send the service request message to a mobility management entity (MME) to initiate the service request procedure.

In the apparatus of any previous examples, the computer-readable storage media may have stored thereon instructions for execution by the processing circuitry to: identify user data to be sent to the MME; and include an EPS session management (ESM) data transport message in the service request message, the ESM data transport message to comprise the user data.

In the apparatus of any previous examples, the service request message may comprise an ESM message container information element (IE) containing the ESM data transport message.

In the apparatus of any previous examples, the computer-readable storage media of the second example may have stored thereon instructions for execution by the processing circuitry to: determine to initiate the service request procedure in response to a determination that uplink user data is pending at the UE; and set the service type value to indicate a mobile originating request.

In the apparatus of any previous examples, the computer-readable storage media having stored thereon instructions for execution by the processing circuitry to: determine to initiate the service request procedure in response to receipt of a paging message; and set the service type value to indicate a mobile terminating request.

In the apparatus of any previous examples, the computer-readable storage media having stored thereon instructions for execution by the processing circuitry to determine that the service request procedure has been successfully completed based on receipt of a security protected non-access-stratum (NAS) message from the MME.

In the apparatus of any previous examples, the security protected NAS message to comprise a service accept message.

In the apparatus of any previous examples, the computer-readable storage media having stored thereon instructions for execution by the processing circuitry to: identify one or more EPS bearer contexts that an EPS bearer context status information element (IE) comprised in the service accept message indicates as being inactive; and locally deactivate the identified one or more EPS bearer contexts.

In the apparatus of any previous examples, the security protected NAS message to comprise a security mode command message or an EPS session management (ESM) data transport message.

In the apparatus of any previous examples, the computer-readable storage media having stored thereon instructions for execution by the processing circuitry to cause the UE to enter an EMM-REGISTERED state in response to a determination that the service request procedure has been successfully completed.

In the apparatus of any previous examples, the computer-readable storage media having stored thereon instructions for execution by the processing circuitry to reset a service request attempt counter in response to a determination that the service request procedure has been successfully completed.

In the apparatus of any previous examples, the computer-readable storage media having stored thereon instructions for execution by the processing circuitry to stop a timer T3417 in response to a determination that the service request procedure has been successfully completed.

In the apparatus of any previous examples, comprising radio frequency (RF) circuitry to generate RF signals comprising the service request message; and at least one antenna to transmit the RF signals.

In a second example, at least one computer-readable storage medium comprising a set of instructions that, in response to being executed at user equipment (UE), cause the UE to: access a paging message received while the UE is in an Evolved Packet System (EPS) mobility management (EMM)-IDLE state and using EPS services with control plane Cellular Internet of Things (CIoT) EPS optimization; determine, based on the paging message, that a mobility management entity (MME) has user data to send to the UE; and send a service request message to the MME to initiate a service request procedure to enable the UE to receive the user data via a control plane.

In the computer-readable storage medium of any previous examples, comprising determine, based on the paging message, that a mobility management entity (MME) has user data to send to the UE.

In the computer-readable storage medium of any previous examples, the paging message to include a first parameter to indicate a source of downlink data, and a second parameter to indicate whether the control plane or a data plane will transfer the user data.

In the computer-readable storage medium of any previous examples, the service request message to contain a service type information element (IE) comprising a value indicating a mobile terminating request.

In the computer-readable storage medium of any previous examples, comprising instructions that, in response to being executed at the UE, cause the UE to: identify uplink user data pending at the UE; and include the uplink user data in the service request message.

In the computer-readable storage medium of any previous examples, the service request message to comprise an EPS session management (ESM) message container information element (IE) containing an ESM data transport message, the ESM data transport message to contain the uplink user data.

In the computer-readable storage medium of any previous examples, comprising instructions that, in response to being executed at the UE, cause the UE to determine that the service request procedure has been successfully completed based receipt of a security protected non-access-stratum (NAS) message from the MME.

In the computer-readable storage medium of any previous examples, the security protected NAS message to comprise a service accept message.

In the computer-readable storage medium of any previous examples, comprising instructions that, in response to being executed at the UE, cause the UE to: identify one or more EPS bearer contexts that an EPS bearer context status information element (IE) comprised in the service accept message indicates as being inactive; and locally deactivate the identified one or more EPS bearer contexts.

In the computer-readable storage medium of any previous examples, the security protected NAS message to comprise a security mode command message or an EPS session management (ESM) data transport message.

In the computer-readable storage medium of any previous examples, comprising instructions that, in response to being executed at the UE, cause the UE to determine, based on the paging message, that the MME will send the user data via the control plane.

In the computer-readable storage medium of any previous examples, the paging message to include a first parameter to indicate a source of downlink data, and a second parameter to indicate whether the control plane or a data plane will transfer the user data.

In a third example, an apparatus, comprising: processing circuitry; and computer-readable storage media having stored thereon instructions for execution by the processing circuitry to: access, at a mobility management entity (MME), a service request message received from user equipment (UE), the service request message to contain a service type information element (IE); identify a service type value comprised in the service type IE; and in response to a determination that the service type value indicates a mobile terminating request, initiate a transport of user data to the UE via a control plane.

In an apparatus of any previous example, the computer-readable storage media having stored thereon instructions for execution by the processing circuitry to send an EPS session management (ESM) data transport message to the UE, the ESM data transport message to contain the user data.

In an apparatus of any previous example, the computer-readable storage media having stored thereon instructions for execution by the processing circuitry to: detect a presence of an EPS session management (ESM) message container IE within the service request message; and forward contents of the ESM message container IE.

In an apparatus of any previous example, the contents of the ESM message container IE to comprise an ESM data transport message containing user data originating from the UE.

In a fourth example, a method, comprising: accessing a paging message received while the UE is in an Evolved Packet System (EPS) mobility management (EMM)-IDLE state and using EPS services with control plane Cellular Internet of Things (CIoT) EPS optimization; determining, based on the paging message, that a mobility management entity (MME) has user data to send to the UE; and sending a service request message to the MME to initiate a service request procedure to enable the UE to receive the user data via a control plane.

In the method of any previous example, comprising determining, based on the paging message, that a mobility management entity (MME) has user data to send to the UE.

In the method of any previous examples, the paging message to include a first parameter to indicate a source of downlink data, and a second parameter to indicate whether the control plane or a data plane will transfer the user data.

In the method of any previous example, the service request message to contain a service type information element (IE) comprising a value indicating a mobile terminating request.

In the method of any previous example, comprising identifying uplink user data pending at the UE; and including the uplink user data in the service request message.

In the method of any previous example, the service request message to comprise an EPS session management (ESM) message container information element (IE) containing an ESM data transport message, the ESM data transport message to contain the uplink user data.

In the method of any previous example, comprising determining that the service request procedure has been successfully completed based receipt of a security protected non-access-stratum (NAS) message from the MME.

In the method of any previous example, the security protected NAS message to comprise a service accept message.

In the method of any previous example, comprising: identifying one or more EPS bearer contexts that an EPS bearer context status information element (IE) comprised in the service accept message indicates as being inactive; and locally deactivating the identified one or more EPS bearer contexts.

In the method of any previous example, the security protected NAS message to comprise a security mode command message or an EPS session management (ESM) data transport message.

In a fifth example, at least one computer-readable storage medium comprising a set of instructions that, in response to being executed at a processor, cause the processor to: access, at a mobility management entity (MME), a service request message received from user equipment (UE), the service request message to contain a service type information element (IE); identify a service type value comprised in the service type IE; and in response to a determination that the service type value indicates a mobile terminating request, initiate a transport of user data to the UE via a control plane.

In the computer-readable storage medium of any previous example, comprising instructions that when executed cause the processor to send an EPS session management (ESM) data transport message to the UE, the ESM data transport message to contain the user data.

In the computer-readable storage medium of any previous example, comprising instructions that when executed cause the processor to: detect a presence of an EPS session management (ESM) message container IE within the service request message; and forward contents of the ESM message container IE.

In the computer-readable storage medium of any previous example, the contents of the ESM message container IE to comprise an ESM data transport message containing user data originating from the UE.

In a sixth example, a method, comprising: accessing, at a mobility management entity (MME), a service request message received from user equipment (UE), the service request message to contain a service type information element (IE); identifying a service type value comprised in the service type IE; and in response to a determination that the service type value indicates a mobile terminating request, initiating a transport of user data to the UE via a control plane.

In the method of any previous example, comprising sending an EPS session management (ESM) data transport message to the UE, the ESM data transport message to contain the user data.

In the method of any previous example, comprising: detecting a presence of an EPS session management (ESM) message container IE within the service request message; and forwarding contents of the ESM message container IE.

In the method of any previous example, the contents of the ESM message container IE to comprise an ESM data transport message containing user data originating from the UE.

In a seventh example, a system, comprising: a UE according to any of the previous examples; a memory controller; and a display.

In an eighth example, a system, comprising: an apparatus according to any of the previous examples; a memory controller; and a display.

In a ninth example, an apparatus, comprising: means for determining, at user equipment (UE) operating in an Evolved Packet System (EPS) mobility management (EMM)-IDLE mode and configured to use EPS services with control plane Cellular Internet of Things (CIoT) EPS optimization, to initiate a service request procedure to enable a transfer of user data via a control plane; means for generating a service request message that contains a service type information element (IE) comprising a service type value set to indicate either a mobile originating request or a mobile terminating request; and means for sending the service request message to a mobility management entity (MME) to initiate the service request procedure.

In the apparatus of any previous example, comprising: means for identifying user data to be sent to the MME; and means for including an EPS session management (ESM) data transport message in the service request message, the ESM data transport message to comprise the user data.

In the apparatus of any previous example, the service request message to comprise an ESM message container information element (IE) containing the ESM data transport message.

In the apparatus of any previous example, the apparatus, comprising: determining to initiate the service request procedure in response to a determination that uplink user data is pending at the UE; and means for setting the service type value to indicate a mobile originating request.

In the apparatus of any previous example, comprising: means for determining to initiate the service request procedure in response to receipt of a paging message; and means for setting the service type value to indicate a mobile terminating request.

In the apparatus of any previous example, comprising means for determining that the service request procedure has been successfully completed based on receipt of a security protected non-access-stratum (NAS) message from the MME.

In the apparatus of any previous example, the security protected NAS message to comprise a service accept message.

In the apparatus of any previous example, comprising: means for identifying one or more EPS bearer contexts that an EPS bearer context status information element (IE) comprised in the service accept message indicates as being inactive; and means for locally deactivating the identified one or more EPS bearer contexts.

In the apparatus of any previous example, the security protected NAS message to comprise a security mode command message or an EPS session management (ESM) data transport message.

In the apparatus of any previous example, comprising means for entering an EMM-REGISTERED state in response to a determination that the service request procedure has been successfully completed.

In the apparatus of any previous example, comprising means for resetting a service request attempt counter in response to a determination that the service request procedure has been successfully completed.

In the apparatus of any previous example, comprising means for stopping a timer T3417 in response to a determination that the service request procedure has been successfully completed.

In the apparatus of any previous example, comprising: means for generating radio-frequency (RF) signals comprising the service request message; and means for transmitting the RF signals.

In a tenth example, an apparatus, comprising: means for accessing, at a mobility management entity (MME), a service request message received from user equipment (UE), the service request message to contain a service type information element (IE); means for identifying a service type value comprised in the service type IE; and in response to a determination that the service type value indicates a mobile terminating request, means for initiating a transport of user data to the UE via a control plane.

In the apparatus of any previous example, comprising means for sending an EPS session management (ESM) data transport message to the UE, the ESM data transport message to contain the user data.

In the apparatus of any previous example, comprising: means for detecting a presence of an EPS session management (ESM) message container IE within the service request message; and means for forwarding contents of the ESM message container IE.

In the apparatus of any previous example, the contents of the ESM message container IE to comprise an ESM data transport message containing user data originating from the UE.

In the apparatus of any previous example, comprising: means for generating radio-frequency (RF) signals comprising the service request message; and means for transmitting the RF signals.

In an eleventh example, a user equipment (UE), comprising: processing circuitry; and computer-readable storage media having stored thereon instructions for execution by the processing circuitry to: access a paging message received while the UE is in an Evolved Packet System (EPS) mobility management (EMM)-IDLE state and using EPS services with control plane Cellular Internet of Things (CIoT) EPS optimization; determine, based on the paging message, that a mobility management entity (MME) has user data to send to the UE; and send a service request message to the MME to initiate a service request procedure to enable the UE to receive the user data via a control plane.

In the UE of any previous example, the service request message to contain a service type information element (IE) comprising a value indicating a mobile terminating request.

In the UE of any previous example, comprising instructions that, in response to being executed at the UE, cause the UE to: identify uplink user data pending at the UE; and include the uplink user data in the service request message.

In the UE of any previous example, the service request message to comprise an EPS session management (ESM)

message container information element (IE) containing an ESM data transport message, the ESM data transport message to contain the uplink user data.

In the UE of any previous example, comprising instructions that, in response to being executed at the UE, cause the UE to determine that the service request procedure has been successfully completed based receipt of a security protected non-access-stratum (NAS) message from the MME.

In the UE of any previous example, the security protected NAS message to comprise a service accept message.

In the UE of any previous example, comprising instructions that, in response to being executed at the UE, cause the UE to: identify one or more EPS bearer contexts that an EPS bearer context status information element (IE) comprised in the service accept message indicates as being inactive; and locally deactivate the identified one or more EPS bearer contexts.

In the UE of any previous example, the security protected NAS message to comprise a security mode command message or an EPS session management (ESM) data transport message.

In the UE of any previous example, comprising instructions that, in response to being executed at the UE, cause the UE to determine, based on the paging message, that the MME will send the user data via the control plane.

In the UE of any previous example, comprising instructions that, in response to being executed at the UE, cause the UE to the paging message to include a first parameter to indicate a source of downlink data, and a second parameter to indicate whether the control plane or a data plane will transfer the user data.

In a twelfth example, a method, comprising: accessing a paging message received while the UE is in an Evolved Packet System (EPS) mobility management (EMM)-IDLE state and using EPS services with control plane Cellular Internet of Things (CIoT) EPS optimization; determining, based on the paging message, that a mobility management entity (MME) has user data to send to the UE; and sending a service request message to the MME to initiate a service request procedure to enable the UE to receive the user data via a control plane.

In the method of any previous example, the service request message to contain a service type information element (IE) comprising a value indicating a mobile terminating request.

In the method of any previous example, comprising instructions that, in response to being executed at the UE, cause the UE to: identify uplink user data pending at the UE; and include the uplink user data in the service request message.

In the method of any previous example, the service request message to comprise an EPS session management (ESM) message container information element (IE) containing an ESM data transport message, the ESM data transport message to contain the uplink user data.

In the method of any previous example, comprising instructions that, in response to being executed at the UE, cause the UE to determine that the service request procedure has been successfully completed based receipt of a security protected non-access-stratum (NAS) message from the MME.

In the method of any previous example, the security protected NAS message to comprise a service accept message.

In the method of any previous example, comprising instructions that, in response to being executed at the UE, cause the UE to: identify one or more EPS bearer contexts that an EPS bearer context status information element (IE) comprised in the service accept message indicates as being inactive; and locally deactivate the identified one or more EPS bearer contexts.

In the method of any previous example, the security protected NAS message to comprise a security mode command message or an EPS session management (ESM) data transport message.

In the method of any previous example, comprising determining, based on the paging message, that the MME will send the user data via the control plane.

In the method of any previous example, the paging message to include a first parameter to indicate a source of downlink data, and a second parameter to indicate whether the control plane or a data plane will transfer the user data.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other.

The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   processing circuitry; and
   non-transitory computer-readable storage media having stored thereon instructions for execution by the processing circuitry to:
   determine, at user equipment (UE) operating in an Evolved Packet System (EPS) mobility management (EMM)-IDLE mode and configured to use EPS services with control plane Cellular Internet of Things (CIoT) EPS optimization, to initiate a service request procedure to enable a transfer of user data via a control plane;
   generate a service request message that contains a service type information element (IE) and an EPS session management (ESM) container IE, the service type IE comprising a service type value set to indicate either a mobile originating request or a mobile terminating request; and
   send the service request message to a mobility management entity (MME) to initiate the service request procedure; and
   determine that the service request procedure has been successfully completed based on receipt of a security protected non-access-stratum (NAS) message from the MME.

2. The apparatus of claim 1, the computer-readable storage media having stored thereon instructions for execution by the processing circuitry to:
   identify user data to be sent to the MME; and
   include an ESM data transport message in the service request message, the ESM data transport message to comprise the user data.

3. The apparatus of claim 2, the service request message to comprise the ESM message container IE containing the ESM data transport message.

4. The apparatus of claim 2, the computer-readable storage media having stored thereon instructions for execution by the processing circuitry to:
   determine to initiate the service request procedure in response to a determination that uplink user data is pending at the UE; and
   set the service type value to indicate a mobile originating request.

5. The apparatus of claim 1, the computer-readable storage media having stored thereon instructions for execution by the processing circuitry to:
   determine to initiate the service request procedure in response to receipt of a paging message; and
   set the service type value to indicate a mobile terminating request.

6. The apparatus of claim 1, the security protected NAS message to comprise a service accept message.

7. The apparatus of claim 1, the computer-readable storage media having stored thereon instructions for execution by the processing circuitry to:
   identify one or more EPS bearer contexts that an EPS bearer context status information element (IE) comprised in the service accept message indicates as being inactive; and
   locally deactivate the identified one or more EPS bearer contexts.

8. The apparatus of claim 1, the security protected NAS message to comprise a security mode command message or an EPS session management (ESM) data transport message.

9. The apparatus of claim 1, the computer-readable storage media having stored thereon instructions for execution by the processing circuitry to cause the UE to enter an EMM-REGISTERED state in response to a determination that the service request procedure has been successfully completed.

10. The apparatus of claim 1, the computer-readable storage media having stored thereon instructions for execution by the processing circuitry to reset a service request attempt counter in response to a determination that the service request procedure has been successfully completed.

11. The apparatus of claim 1, the computer-readable storage media having stored thereon instructions for execution by the processing circuitry to stop a timer T3417 in response to a determination that the service request procedure has been successfully completed.

12. The apparatus of claim 1, comprising:
   radio frequency (RF) circuitry to generate RF signals comprising the service request message; and
   at least one antenna to transmit the RF signals.

13. At least one non-transitory computer-readable storage medium comprising a set of instructions that, in response to being executed at user equipment (UE), cause the UE to:
   access a paging message received while the UE is in an Evolved Packet System (EPS) mobility management (EMM)-IDLE state and using EPS services with control plane Cellular Internet of Things (CIoT) EPS optimization;
   determine, based on the paging message, that a mobility management entity (MME) has user data to send to the UE;
   determine, based on the paging message, that the MME will send the user data via a control plane to the UE; and
   send a service request message to the MME to initiate a service request procedure to enable the UE to receive the user data via the control plane; and
   determine that the service request procedure has been successfully completed based on receipt of a security protected non-access-stratum (NAS) message from the MME.

14. The at least one computer-readable storage medium of claim 13, the service request message to contain a service type information element (IE) comprising a value indicating a mobile terminating request.

15. The at least one computer-readable storage medium of claim 13, comprising instructions that, in response to being executed at the UE, cause the UE to:
identify uplink user data pending at the UE; and
include the uplink user data in the service request message.

16. The at least one computer-readable storage medium of claim 15, the service request message to comprise an EPS session management (ESM) message container information element (IE) containing an ESM data transport message, the ESM data transport message to contain the uplink user data.

17. The at least one computer-readable storage medium of claim 13, the security protected NAS message to comprise a service accept message.

18. The at least one computer-readable storage medium of claim 17, comprising instructions that, in response to being executed at the UE, cause the UE to:
identify one or more EPS bearer contexts that an EPS bearer context status information element (IE) comprised in the service accept message indicates as being inactive; and
locally deactivate the identified one or more EPS bearer contexts.

19. The at least one computer-readable storage medium of claim 13, the security protected NAS message to comprise a security mode command message or an EPS session management (ESM) data transport message.

20. An apparatus, comprising:
processing circuitry; and
non-transitory computer-readable storage media having stored thereon instructions for execution by the processing circuitry to:
access, at a mobility management entity (MME), a service request message received from user equipment (UE), the service request message to contain a service type information element (IE) and an EPS session management (ESM) message container IE;
identify a service type value comprised in the service type IE;
in response to a determination that the service type value indicates a mobile terminating request, initiate a transport of user data to the UE via a control plane; and
send a security protected non-access-stratum (NAS) message to the UE to indicate that the service request procedure has been successfully completed from the MME.

21. The apparatus of claim 20, the computer-readable storage media having stored thereon instructions for execution by the processing circuitry to send an ESM data transport message to the UE, the ESM data transport message to contain the user data.

22. The apparatus of claim 20, the computer-readable storage media having stored thereon instructions for execution by the processing circuitry to:
detect a presence of the ESM message container IE within the service request message; and
forward contents of the ESM message container IE.

23. The apparatus of claim 22, the contents of the ESM message container IE to comprise an ESM data transport message containing user data originating from the UE.

* * * * *

UNITED STATES PATENT AND TRADEMARK OFFICE
CERTIFICATE OF CORRECTION

| | | |
|---|---|---|
| PATENT NO. | : 12,133,285 B2 | Page 1 of 1 |
| APPLICATION NO. | : 17/836136 | |
| DATED | : October 29, 2024 | |
| INVENTOR(S) | : Vivek Gupta | |

It is certified that error appears in the above-identified patent and that said Letters Patent is hereby corrected as shown below:

In the Claims

In Column 40, Claim 7, Line 15, "The apparatus of claim 1,..." should read "The apparatus of claim 6,..."

Signed and Sealed this
Eleventh Day of February, 2025

Coke Morgan Stewart
*Acting Director of the United States Patent and Trademark Office*